(12) United States Patent
Alotaibi et al.

(10) Patent No.: US 12,712,973 B1
(45) Date of Patent: Aug. 18, 2026

(54) INTELLIGENT AGENTIC METHODS AND SYSTEMS FOR HANDLING AN EMERGENCY CALL

(71) Applicant: Saudi Technology and Security Comprehensive Control Co. Ltd., Riyadh (SA)

(72) Inventors: Areej Turky Alotaibi, Riyadh (SA); Lina Mohammed Alqahtani, Riyadh (SA); Nouf Hezam Alsubaie, Riyadh (SA); Omar Naeem Talaby, Riyadh (SA)

(73) Assignee: Saudi Technology and Security Comprehensive Control Co. Ltd., Riyadh (SA)

( * ) Notice: Subject to any disclaimer, the term of this patent is extended or adjusted under 35 U.S.C. 154(b) by 0 days.

(21) Appl. No.: 19/463,956

(22) Filed: Jan. 29, 2026

(51) Int. Cl.
*H04M 3/527* (2006.01)
*G06F 40/174* (2020.01)
*H04W 4/90* (2018.01)

(52) U.S. Cl.
CPC .......... *H04M 3/527* (2013.01); *G06F 40/174* (2020.01); *H04W 4/90* (2018.02)

(58) Field of Classification Search
None
See application file for complete search history.

(56) References Cited

U.S. PATENT DOCUMENTS 12,245,123 B2 * 3/2025 Martin .................... H04W 4/12
2017/0188216 A1 * 6/2017 Koskas .................. H04W 4/90

* cited by examiner

*Primary Examiner* — Duc Nguyen
*Assistant Examiner* — Assad Mohammed
(74) *Attorney, Agent, or Firm* — Baker & McKenzie LLP

(57) ABSTRACT

Disclosed are urban intelligence agentic methods and systems for intelligently handling an emergency call. An exemplary method includes: receiving a first substantially real-time audio stream; initiating processing the first substantially real-time audio stream, thereby generating processed data; initiating analyzing the first substantially real-time audio stream, thereby generating analyzed data; synchronizing, using the one or more computing device processors, the processed data and the analyzed data; initiating execution of a first computing operation using the processed data, the analyzed data, and background data, thereby generating emergency data; generating, based on the at least one accessing the at least one intelligence model, based on the emergency data, a response to the first substantially real-time audio stream; initiating execution of a second computing operation associated with the emergency data, thereby generating routing data; generating a timeline associated with the emergency data; and transmitting or storing a report associated with the emergency data.

20 Claims, 7 Drawing Sheets

INTELLIGENT AGENTIC METHODS AND SYSTEMS FOR HANDLING AN EMERGENCY CALL

TECHNICAL FIELD

The present methods and systems are directed to urban intelligence solutions for handling an emergency call.

BACKGROUND

There is a need for an advanced system capable of analyzing an audio stream and intelligently responding in substantially real-time.

SUMMARY

The disclosed systems and methods may leverage urban intelligence technologies configured to utilize sensor data, including multi-sensor and real-time data, from environments like emergency situations.

A disclosed method for intelligently handling an emergency call comprises: receiving, using one or more computing device processors, from a device associated with a first user at a physical location, a first substantially real-time audio stream; initiating processing, using the one or more computing device processors, in a first pipeline, at a first time, the first substantially real-time audio stream, thereby generating processed data; initiating analyzing, using the one or more computing device processors, in a second pipeline, at the first time, the first substantially real-time audio stream, thereby generating analyzed data; synchronizing, using the one or more computing device processors, the processed data and the analyzed data; storing, using the one or more computing device processors, the processed data and the analyzed data; retrieving, using the one or more computing device processors, from at least one trusted source, background data; initiating execution of, using the one or more computing device processors, based on at least one accessing at least one intelligence model, a first computing operation using the processed data, the analyzed data, and the background data; generating, using the one or more computing device processors, based on the first computing operation associated with the processed data, the analyzed data, and the background data, emergency data, wherein the emergency data comprises: location data, hazard data, severity data, and state data; generating, using the one or more computing device processors, based on the at least one accessing the at least one intelligence model, based on the emergency data, a response to the first substantially real-time audio stream; determining, using the one or more computing device processors, based on the emergency data, a harm indicator associated with the physical location; initiating execution of, using the one or more computing device processors, based on the at least one accessing the at least one intelligence model, a second computing operation associated with the emergency data and the harm indicator associated with the physical location; generating, using the one or more computing device processors, based on the second computing operation associated with the emergency data and the harm indicator associated with the physical location, routing data, wherein the routing data comprises a first severity indicator and a first computing system, wherein no human interaction with the first user is required to generate the routing data; refining, using the one or more computing device processors, based on the at least one accessing the at least one intelligence model, the routing data; generating, using the one or more computing device processors, a timeline associated with the emergency data; generating, using the one or more computing device processors, based on at least a portion of the timeline associated with the emergency data, a report associated with the emergency data; and transmitting, using the one or more computing device processors, to the first computing system or a second computing system, or storing, using the one or more computing device processors, in a database, the report associated with the emergency data.

In some embodiments, the method further comprises: transmitting, using the one or more computing device processors, to the device associated with the first user, the response to the first substantially real-time audio stream; and receiving, using the one or more computing device processors, from the device associated with the first user, a second substantially real-time audio stream.

According to other embodiments, the method further comprises: detecting, using the one or more computing device processors, an incomplete field comprised in the emergency data; generating, using the one or more computing device processors, based on the incomplete field comprised in the emergency data, a prompt for the first user; transmitting, using the one or more computing device processors, to the device associated with the first user, the prompt; and receiving, using the one or more computing device processors, from the device associated with the first user, a second substantially real-time audio stream.

In yet other embodiments, the method further comprises: determining, using the one or more computing device processors, if a first field comprised in the emergency data is greater than a threshold value; and triggering, using the one or more computing device processors, based on determining the first field comprised in the emergency data is greater than the threshold value, a notification.

According to still other embodiments, the determining the harm indicator associated with the physical location comprises classifying type of harm occurring at the physical location.

It is appreciated that, in some cases, the first substantially real-time audio stream comprises at least one of: a recording or a transcript.

In other cases, the one or more computing device processors are comprised in one or more computing systems, wherein the one or more computing systems are located in one or more locations.

One or more systems are disclosed for intelligently handling an emergency call, the one or more systems comprising one or more computing servers comprising: one or more computing device processors; and a memory storing instructions, the instructions being executable by the one or more computing device processors to: receive, from a device associated with a first user at a physical location, a first substantially real-time audio stream; initiate processing, in a first pipeline, at a first time, the first substantially real-time audio stream, thereby generating processed data; initiate analyzing, in a second pipeline, at the first time, the first substantially real-time audio stream, thereby generating analyzed data; synchronize the processed data and the analyzed data; store the processed data and the analyzed data; retrieve, from at least one trusted source, background data; initiate execution of, based on at least one accessing at least one intelligence model, a first computing operation using the processed data, the analyzed data, and the background data; generate, based on the first computing operation using the processed data, the analyzed data, and the background data, emergency data, wherein the emergency data comprises: location data, hazard data, severity data, and state data; generate, based on the at least one accessing the at least one intelligence model, based on the emergency data, a response to the first substantially real-time audio stream; determine, based on the emergency data, a harm indicator associated with the physical location; initiate execution of, based on the at least one accessing the at least one intelligence model, a second computing operation associated with the emergency data and the harm indicator associated with the physical location; generate, based on the second computing operation associated with the emergency data and the harm indicator associated with the physical location, routing data, wherein the routing data comprises a first severity indicator and a first computing system, wherein no human interaction is requited to generate the routing data; refine, based on accessing the at least one intelligence model, the routing data; generate a timeline associated with the emergency data; generate, based on at least a portion of the timeline associated with the emergency data, a report associated with the emergency data; and transmit, to the first computing system or a second computing system, the report associated with the emergency data.

According to one embodiment, the location data comprises or is associated with at least one of: the physical location, global positioning system (GPS) data, or an address.

In another embodiment, the hazard data comprises or is associated with at least one of: a hazard type, a medical emergency, a self-harm situation, a fire, an accident, an emergency situation, a terror event, an environmental hazard, or a hazardous condition.

According to yet another embodiment, the severity data comprises or is based on at least one of: a stress level associated with the first user, an intensity level, a noise level, a speech velocity associated with the first user, or at least one keyword comprised in the first substantially real-time audio stream.

In still another embodiment, the state data comprises or is based on at least one of: a first state associated with the first user, a second state associated with a victim, a third state associated with the physical location, or a number of people at the physical location.

According to further embodiments, the at least one trusted source comprises a dynamically prioritized retrieval source.

Another disclosed method for intelligently handling an emergency call comprises: receiving, using one or more computing device processors, from a device associated with a first user at a physical location, a first substantially real-time audio stream; initiating processing, using the one or more computing device processors, in a first pipeline, at a first time, the first substantially real-time audio stream, thereby generating processed data; initiating analyzing, using the one or more computing device processors, in a second pipeline, at the first time, the first substantially real-time audio stream, thereby generating analyzed data; synchronizing, using the one or more computing device processors, the processed data and the analyzed data; storing, using the one or more computing device processors, the processed data and the analyzed data; retrieving, using the one or more computing device processors, from at least one trusted source, background data; initiating execution of, using the one or more computing device processors, based on at least one accessing at least one intelligence model, a first computing operation using the processed data, the analyzed data, and the background data; generating, using the one or more computing device processors, based on the first computing operation using the processed data, the analyzed data, and the background data, emergency data, wherein the emergency data comprises at least two of: location data, hazard data, severity data, or state data; generating, using the one or more computing device processors, based on the at least one accessing the at least one intelligence model, based on the emergency data, a response to the first substantially real-time audio stream; determining, using the one or more computing device processors, based on the emergency data, a harm indicator associated with the physical location; initiating execution of, using the one or more computing device processors, based on the at least one accessing the at least one intelligence model, a second computing operation associated with the emergency data and the harm indicator associated with the physical location; generating, using the one or more computing device processors, based on the second computing operation associated with the emergency data and the harm indicator associated with the physical location, routing data, wherein the routing data comprises a first severity indicator and a first computing system, wherein no human interaction is requited to generate the routing data; refining, using the one or more computing device processors, based on the at least one accessing the at least one intelligence model, the routing data; generating, using the one or more computing device processors, a timeline associated with the emergency data; generating, using the one or more computing device processors, based on at least a portion of the timeline associated with the emergency data, a report associated with the emergency data; and transmitting, using the one or more computing device processors, to the first computing system or a second computing system, the report associated with the emergency data.

In some embodiments, the method further comprises transmitting, using the one or more computing device processors, to the device associated with the first user, the response to the first substantially real-time audio stream; and receiving, using the one or more computing device processors, from the device associated with the first user, a second substantially real-time audio stream.

According to other embodiments, the method further comprises: detecting, using the one or more computing device processors, an incomplete field comprised in the emergency data; generating, using the one or more computing device processors, based on the incomplete field comprised in the emergency data, a prompt for the first user; transmitting, using the one or more computing device processors, to the device associated with the first user, the prompt; and receiving, using the one or more computing device processors, from the device associated with the first user, a second substantially real-time audio stream.

Furthermore, in yet other embodiments, the method further comprises: initiating processing, using the one or more computing device processors, the second substantially real-time audio stream, thereby generating second processed data; initiating execution of, using the one or more computing device processors, based on at least one accessing the at least one intelligence model, a third computing operation using the second processed data, the analyzed data, and the background data; updating, using the one or more computing device processors, based on the second computing operation associated with the second processed data, the analyzed data, and the background data, the emergency data, thereby generating updated emergency data; updating, using the one or more computing device processors, based on the updated emergency data, the harm indicator associated with the physical location, thereby generating an updated harm indicator; initiating execution of, using the one or more computing device processors, a fourth computing operation associated with the updated emergency data and the updated harm indicator; and updating, using the one or more computing device processors, based on the fourth computing operation associated with the updated emergency data and the updated harm indicator, the routing data, thereby generating updated routing data comprising a second severity indicator.

According to still other embodiments, the method further comprises: determining, using the one or more computing device processors, if a first field comprised in the emergency data is greater than a threshold value; and triggering, using the one or more computing device processors, based on determining the first field comprised in the emergency data is greater than the threshold value, a notification.

In some cases, the processed data comprises at least one of: a transcript associated with the first substantially real-time audio stream, a semantic feature extracted from the first substantially real-time audio stream, an entity extracted from the first substantially real-time audio stream, or a harmful intent classification determined based on the transcript associated with the first substantially real-time audio stream and acoustic cues comprised in the first substantially real-time audio stream.

In other cases, the analyzed data comprises at least one of: a noise signature associated with the first substantially real-time audio stream, a noise pattern associated with the first substantially real-time audio stream, an environmental hazard indicator associated with the first substantially real-time audio stream, a non-linguistic event classification associated with the first substantially real-time audio stream, an irregularity associated with the first substantially real-time audio stream, a stress indicator associated with the first substantially real-time audio stream, or a panic indicator associated with the first substantially real-time audio stream.

BRIEF DESCRIPTION OF DRAWINGS

The disclosure is illustrated by way of example, and not by way of limitation in the figures of the accompanying drawings in which like reference numerals are used to refer to similar elements. It is emphasized that various features may not be drawn to scale and the dimensions of various features may be arbitrarily increased or reduced for clarity of discussion.

DETAILED DESCRIPTION

Reference will now be made in detail to embodiments, examples of which are illustrated in the accompanying drawings and figures. In the following detailed description, numerous specific details are set forth in order to provide a thorough understanding of the disclosed subject-matter. However, it will be apparent to one of ordinary skill in the art that the methods and systems disclosed may be practiced without these specific details.

As used herein, the term "exemplary" or "illustrative" means "serving as an example, an instance, or an illustration." Any implementation described herein as exemplary or illustrative is not necessarily to be construed as advantageous and/or preferred over other embodiments. Unless the context requires otherwise, throughout the description and the claims, the word "comprise" and variations thereof, such as "comprises" and "comprising" are to be construed in an open, inclusive sense, i.e., as "including, but not limited to."

Furthermore, the terms substantially real-time and near real-time, as used herein, refer to a processing and response timeframe that is close to, but not necessarily equal to, instantaneous or true real-time. While true real-time implies a delay of zero, any practical digital system will have some inherent latency due to data processing, computation, and network transmission. Therefore, these terms describe a timeframe where this inherent latency is sufficiently short as to be negligible for the effective operation of a given process or for the perception of a human user. The specific duration considered to be substantially real-time or near real-time is application-dependent and is defined by the requirements of the system to function as intended without being materially compromised by the delay.

For example, in different embodiments of this disclosure, the acceptable delay can vary significantly. In the context of streaming interactive video or augmented reality, near real-time may correspond to a total latency of less than 200 milliseconds, as longer delays can become perceptible and disruptive to a user. Thus, these terms encompass any timeframe in which the system's response is delivered quickly enough to be relevant and actionable for its specific purpose.

Network Environment

Figure 1:
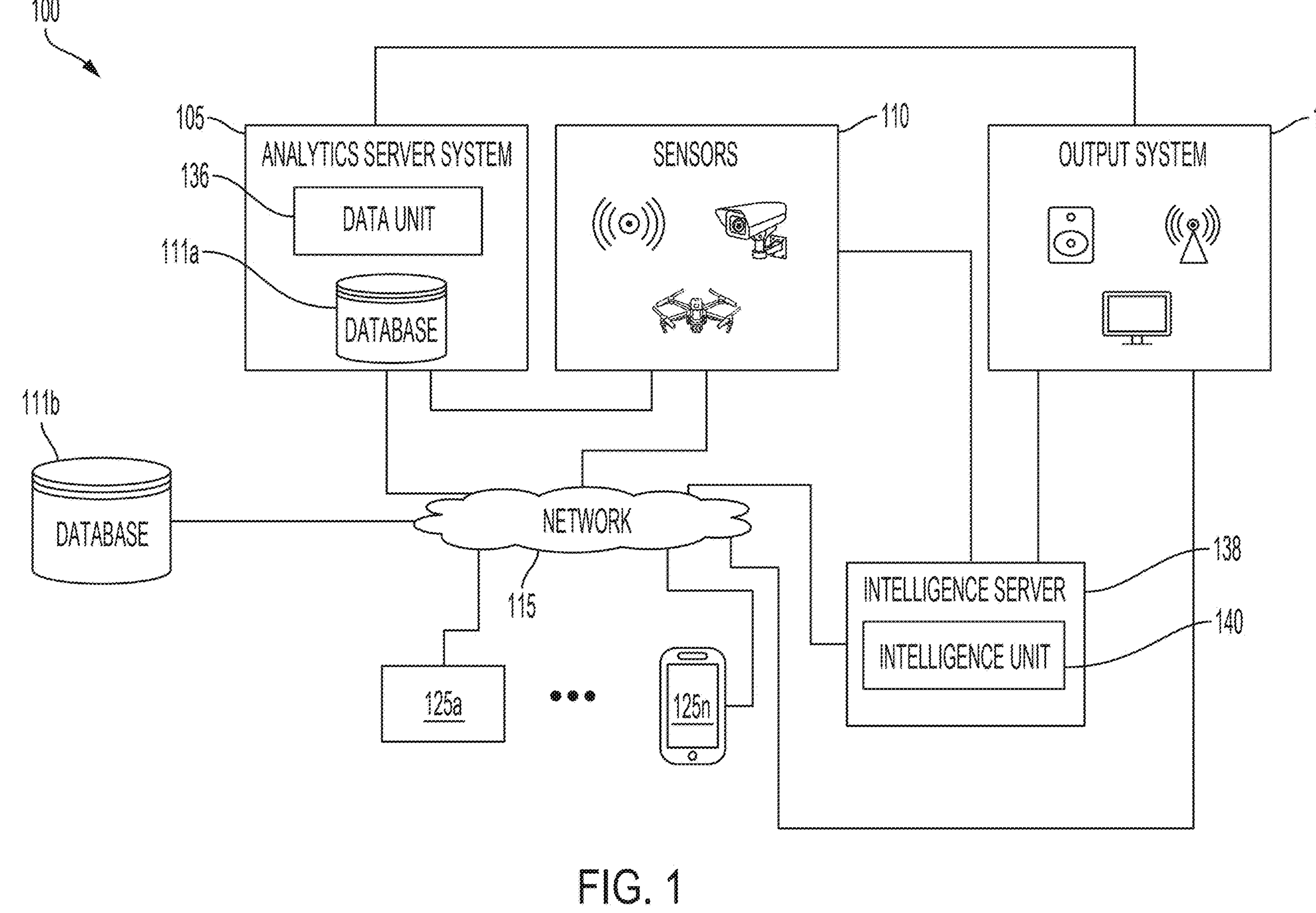
FIG. 1 shows an exemplary network system for executing the principles disclosed.

Shown in FIG. 1 is an exemplary network system 100 for executing the principles disclosed. Specifically, the exemplary network system 100 may be used to implement dynamic tracking of at least motive properties of a vehicle on a roadway. In the illustrated implementation, the network system 100 includes an analytics server system 105, one or more sensors 110, one or more computing databases 111*a* and 111*b*, and one or more output system 120, all of which are communicatively coupled to a network 115. Also connected to the network 115 are one or more endpoint devices 125*a* . . . 125*n* and an intelligence server 138.

It is appreciated that the implementation of the analytics server system 105 and/or the intelligence server 138 may be physically structured in various configurations. In one embodiment, the one or more computing device processors that execute the functions of the analytics server system 105 and/or the intelligence server 138 may be co-located at a single geographical location or housed within a single data center. Alternatively, the one or more computing device processors that execute the functions of the analytics server system 105 and/or the intelligence server 138 may be realized in a distributed computing environment, where multiple computing device processors are spread across disparate physical locations and are communicatively coupled over a network to operate in a coordinated or parallel fashion.

According to one embodiment, the analytics server system 105 includes a computing device such as a content server, a communication server, a laptop computer, a desktop computer, a handheld computing device, a tablet computing device, a virtual machine, a cloud-based computing system and/or a cloud-based service, and/or the like. The analytics server system 105 may include a plurality of computing devices configured to communicate with one another and/or communicate with other systems comprised in the network system 100 to implement the techniques described herein.

According to one embodiment, the analytics server system 105 comprises a data unit 136 (also referred to as one or more data units elsewhere herein) and at least one local computing database 111*a*. For example, results from implementing the disclosed methods may be stored in the local computing database 111*a* or in a remote computing database 111*b* that is physically distal (e.g., implemented in a first location that is different from a second location where the local computing database 111*a* is implemented). According to one embodiment, the local computing database 111*a* and the remote computing database 111*b* may include a non-volatile memory or similar permanent storage device and media. For example, the local computing database 111*a* and the remote computing database 111*b* can be a hard disk drive, a CD-ROM device, a DVD-ROM device, a DVD-RAM device, a DVD-RW device, a flash memory device, solid state media, or some other mass storage device known in the art for storing information on a more permanent basis.

Figure 2:
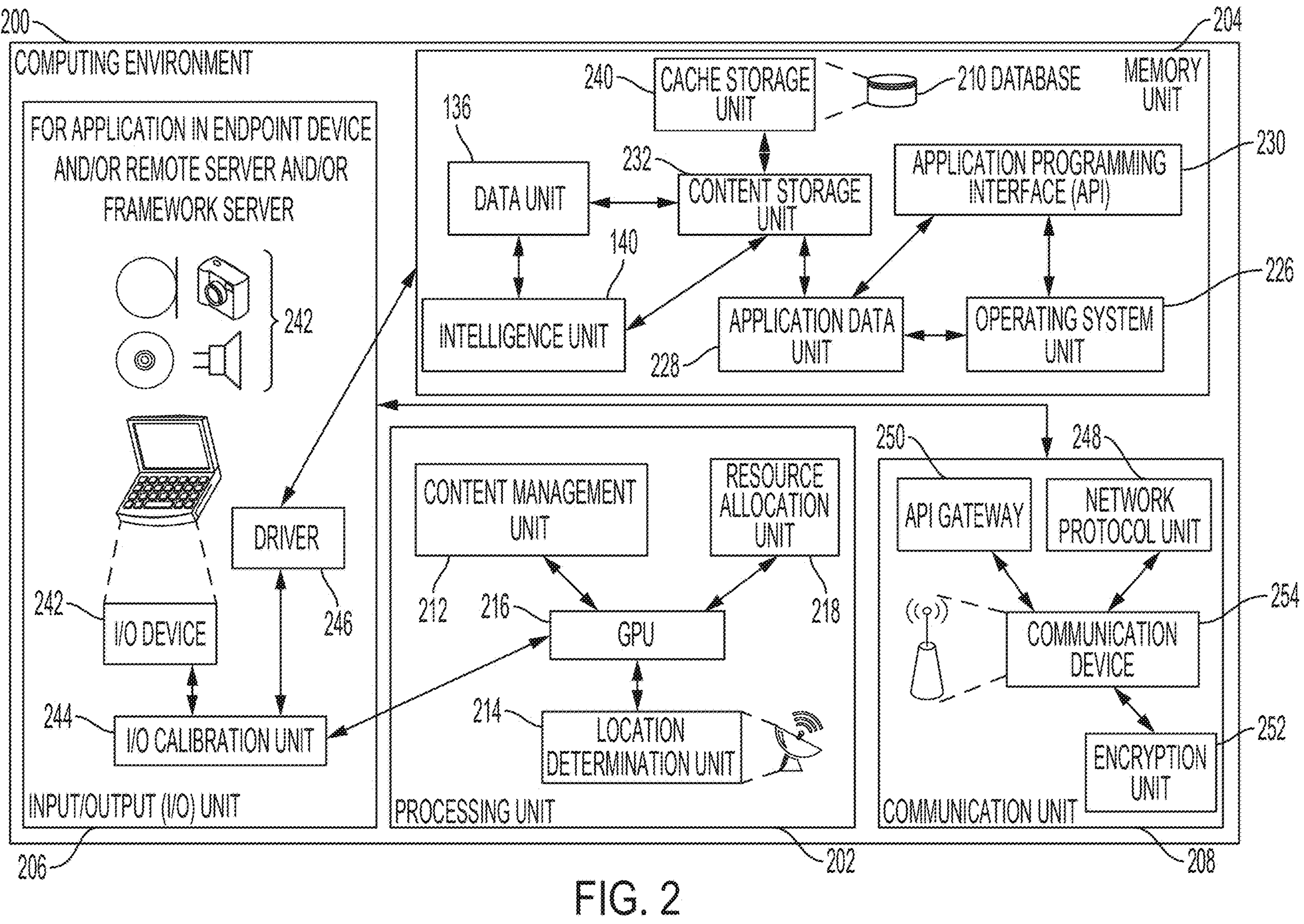
FIGS. 2 and 3 illustrate exemplary system and functional diagrams of a computing environment, within which one or more systems shown in FIG. 1 can be implemented.
Figure 3:
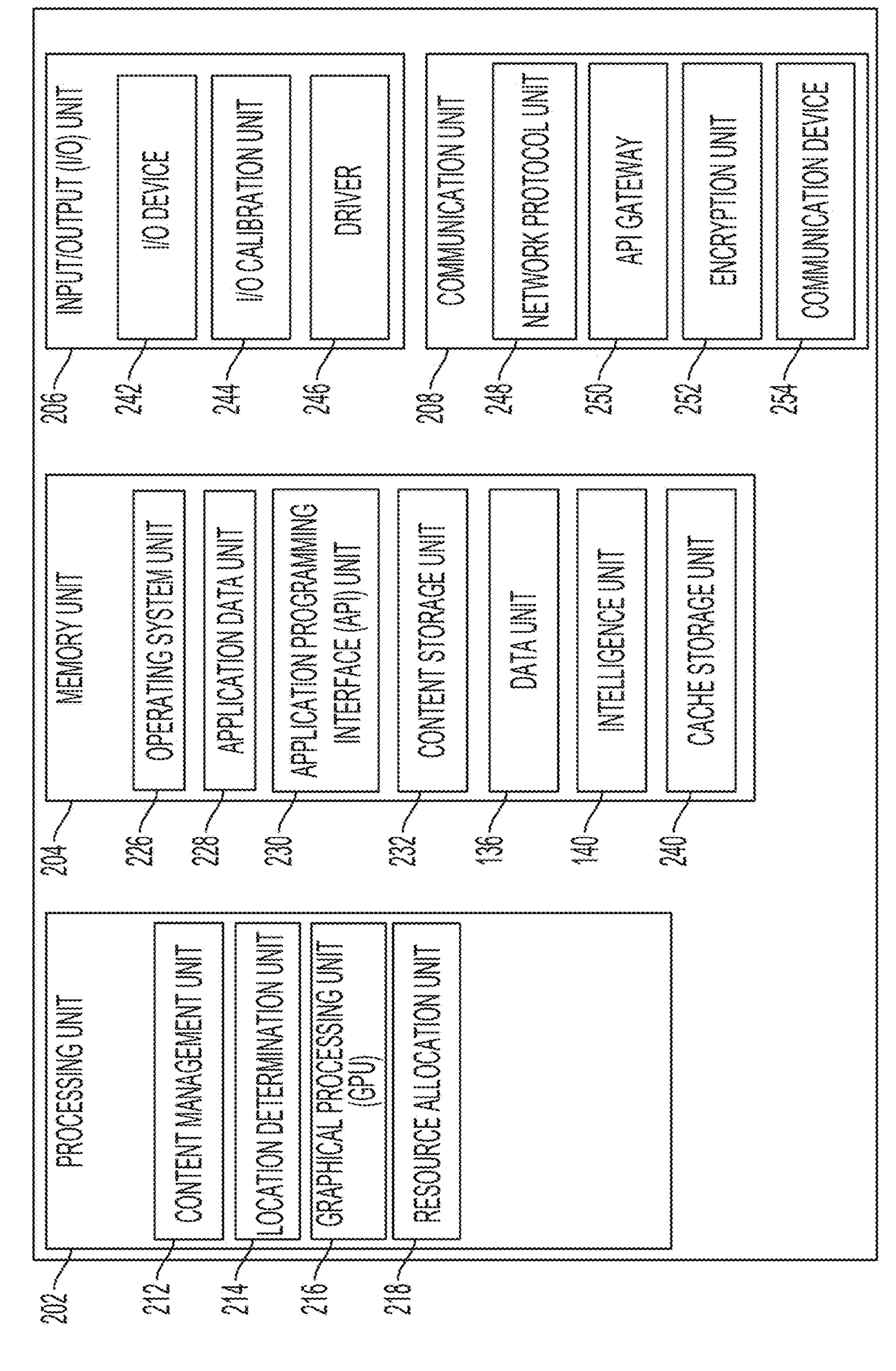

The data unit 136 referenced above may include one or more instructions or computer logic that are executed by the one or more processors such as the processors discussed in association with FIGS. 2 and 3. The data unit 136 referenced herein comprises an executable software module containing one or more instructions or computer-executable logic. These instructions are specifically configured to be executed by one or more processors, such as the processors discussed in association with FIGS. 2 and 3, to perform the disclosed method. In particular, upon execution by said processors, the instructions within the data unit 136 causes a computing system to carry out the specific processing procedures, methods, techniques, and workflows provided in this disclosure. Thus, the data unit 136 represents a tangible software implementation that directs a computing device to function as a specialized machine for executing the disclosed method.

The analytics server system 105 may be configured to communicate with the one or more systems coupled to the network 115. This can include communications between the analytics server system 105 and the sensors 110 to transmit captured substantially real-time data (e.g., static images or dynamic images including or excluding a video stream, audio data, touch data, light detection and ranging (LiDAR) data, etc.) to the intelligence server 138 to resolve, classify, and identify features of objects (e.g., vehicles) captured by the sensors 110. In addition, this communication can involve the transmission of one or more alerts from the analytics server system 105 to the one or more endpoint devices 125*a* . . . 125*n*.

According to one embodiment, the analytics server system 105 can be coupled, via the network 115, to an intelligence server 138 configured to control or regulate, in conjunction with, or independent of the data unit 136, training of one or more computing models configured for implementing data classification and/or object identification computing operations. In some cases, the intelligence server 138 can comprise one or more intelligence units 140 that can implement computing operations such as: zero-shot learning computing operations, few-shot learning computing operations, and result/model fine-tuning computing operations. Additionally, or alternatively, one or more intelligent artificial intelligence (AI) models and/or machine learning (ML) models may comprise, or be based on at least one of: GPT-4, LLAMA-3, BLOOM, PaLM, GPT-3.5, BERT, Gemini, LaMDA, Perplexity, or Falcon. Additionally, or alternatively, one or more of the AI or ML models may also include multiple intelligence models and therefore may be configured to perform and/or execute multiple processes in parallel. In addition, the AI or ML models disclosed may include various artificial intelligence systems or structures, including but not limited to large language models (LLMs), deep learning models, machine learning models, neural networks (e.g., convolutional neural networks (CNNs), recurrent neural networks (RNNs), transformers), expert systems, decision trees, and reinforcement learning models.

Additionally, or alternatively, one or more of the AI/ML models may also include multiple intelligence models (e.g., separately trained intelligence models) and therefore may be configured to perform and/or execute multiple processes in parallel. In some embodiments, the intelligence server 138 may include a special chipset for processing large amounts of data and/or complex computing operations in a reduced amount of time. These chipsets may include, but are not limited to, Graphics Processing Units (GPUs), Tensor Processing Units (TPUs), Field-Programmable Gate Arrays (FPGAs), Application-Specific Integrated Circuits (ASICs) specifically designed for artificial intelligence (AI) workloads, or neuromorphic chips. Such chipsets can be configured to have parallel computing architectures, enabling efficient execution of matrix multiplications and convolutions, which comprise computing operations in a given intelligence model, particularly deep learning models. This parallel processing capability can allow for rapid ingestion, analysis, and processing of vast datasets, thereby accelerating model training, inference, and overall performance of the intelligence server 138 and/or analytics server system 105. The chipsets referenced herein may further incorporate dedicated memory architectures (e.g., High Bandwidth Memory (HBM)) optimized for the data throughput requirements of large intelligence models.

In some embodiments, the intelligence unit 140, or components thereof, may be implemented and/or deployed on dedicated hardware accelerators embedded within a system-on-chip (SoC) or as discrete integrated circuits. These hardware implementations can facilitate high-speed data processing and low-latency inference, needed for real-time applications such analyzing captured substantially real-time data. Furthermore, the intelligence server 138, or components thereof, including specialized chipsets and intelligence models, may be provided by a third-party vendor or service provider (e.g., via cloud-based AI/ML platforms) or may be developed and maintained in-house.

Once captured by the one or more sensors, the substantially real-time data may be transmitted to the analytics server system 105 and/or to the intelligence server 138 for processing. The analytics server system 105, acting as a central hub, can orchestrate the analysis of the data, while the intelligence server, powered by advanced AI and ML computing processes, performs the computationally intensive tasks. For example, the disclosed network system 100 might use a deep learning model of the intelligence server 138 to perform object detection on image data, identifying and classifying various objects in real-time. It could then employ a separate computing process to analyze the movement and behavior objects, recognizing complex interactions or anomalies. In some cases, the intelligence server 138 may combine data from multiple sensors 110 and can fuse a thermal image with a visual one to more accurately identify an object or use LiDAR data to provide precise spatial context to a 2D image. This integrated approach allows the network system 100 to extract a more comprehensive and nuanced understanding of the scene than would be possible with a single processing method, enabling a wide range of applications from security and surveillance to autonomous navigation and environmental monitoring.

It is appreciated that the one or more sensors 110 can comprise one or more visual sensors, audio sensors, touch sensors, radar sensors, LiDAR sensors, GPS sensors, vehicle telemetry sensors, specialized weather sensors, heat or thermal imaging sensors, 3D imaging sensors, AR sensors, VR sensors, and/or chemical sensors.

In some embodiments, the one or more sensors 110 can comprise visual sensors. These sensors may include any device or system capable of capturing, detecting, or measuring visual information from a monitored field. These devices or systems may include cameras, Closed-Circuit Television (CCTV) systems, imaging systems associated with or coupled to an unmanned aerial vehicle (UAV), emotion-optimized cameras, photodetectors, image sensors, satellite imaging sensors, and/or other optical devices. For example, the visual sensors may be configured to acquire visual data, which enables the identification, analysis, and monitoring of objects and environments in real time.

Furthermore, the one or more visual sensors may work with, or have integrated within their hardware setup, various illumination systems to optimize data capture, extending the one or more visual sensors capabilities far beyond standard daylight conditions. These illumination systems, which can be positioned proximally (e.g., a built-in flash on a camera) or distal (e.g., a high-powered floodlight or infrared emitter), work in tandem with the one or more visual sensors to improve the quality and utility of the acquired visual data.

The illumination systems referenced herein can encompass a wide range of technologies, each serving a specific purpose. For visible light imaging, active illumination like high-intensity LEDs or floodlights can be used to brighten a scene, ensuring clear and well-exposed images even in low-light conditions. These systems can be static or dynamic, adjusting their intensity based on the ambient light or focusing on a specific area of interest. For example, a streetlamp-style distal illuminator can provide broad coverage for a public space, while a proximal illuminator on a camera can provide a burst of light for a quick snapshot.

Expanding beyond the visible spectrum, the one or more visual sensors can have attendant infrared (IR) illumination systems, which are crucial for night vision and covert surveillance. These systems can emit IR light, which is invisible to the human eye but detectable by IR-sensitive cameras. This allows the one or more visual sensors to capture detailed images in complete darkness without alerting an imaged object (e.g., a vehicle) in the visual data to its presence. For example, these sensors can be configured for security applications or wildlife monitoring.

Furthermore, the one or more sensors 110 can incorporate other advanced illumination and sensing techniques. Thermal imaging sensors can be used in conjunction with the one or more visual sensors that highlight heat signatures, allowing for the detection of an object (e.g., a vehicle) even through smoke, fog, or camouflage. In some cases, thermal imaging sensors can beneficially enable search and rescue operations or identifying objects (e.g., a vehicle) in a chaotic environment.

In some instances, the one or more sensors 110 can comprise audio sensors. These sensors may include any device or system capable of detecting, capturing, or measuring sound waves or acoustic signals within a monitored environment. These devices or systems may include one or more of microphones, acoustic transducers, acoustic sensors, and/or ultrasonic detectors. For example, the sensors may be configured to identify, classify, and/or analyze sounds associated with objects, vehicles, and/or environmental conditions, and may be deployed in static or dynamic configurations to support a wide range of applications, including monitoring, diagnostics, and situational awareness.

In some embodiments, the one or more sensors 110 may comprise touch sensors. These sensors may include any device or system capable of measuring physical contact, pressure, or tactile input within a monitored environment. These devices or systems may incorporate one or more of capacitive, resistive, piezoelectric, and/or mechanical sensing elements. For example, touch sensors may be configured to detect and analyze physical interactions (e.g., a driver's hands on a steering wheel), which enhances monitoring, control, and operational diagnostics. It is appreciated that a touch sensor may comprise a privacy preserving floor sensor.

In some cases, the one or more sensors 110 may comprise radar sensors. These sensors may include any device capable of emitting electromagnetic waves and detecting their reflections to determine the presence, distance, speed, or movement of objects within a monitored area. These sensors may operate across various frequency bands and may be used for object detection, collision avoidance, or environmental mapping in both static and dynamic scenarios. Like the thermal imaging sensors above, radar sensors are especially useful in identifying an object in a chaotic environment.

In some embodiments, the one or more sensors 110 may comprise light detection and ranging, or LiDAR, sensors. These sensors may include any device configured to emit laser pulses and measure the reflected signals to generate spatial data, such as distance, shape, or surface characteristics of objects. LiDAR sensors may be utilized for three-dimensional mapping, object recognition, or environmental analysis, and may be deployed in fixed or mobile configurations. In some cases, LiDAR sensors beneficially provide precise spatial measurements and three-dimensional mapping (e.g., the curvature of a road), which are essential for object recognition and environmental analysis.

In some instances, the one or more sensors 110 may comprise global positioning system, or GPS, sensors. These sensors may include any device capable of receiving signals from global positioning satellites to determine geographic location, velocity, or timing information. Such devices may be integrated within vehicles or other platforms to provide real-time positioning data for navigation, tracking, or operational analysis. For example, the GPS sensors may be configured to determine an object's location (e.g., the location of a vehicle on a road).

In some cases, the one or more sensors 110 may comprise vehicle telemetry sensors. These sensors may include any device or system configured to monitor, record, or transmit data related to vehicle operation, performance, or status. This may include sensors for speed, acceleration, or braking (e.g., accelerometer), engine parameters, fuel consumption, or other operational metrics, and may support remote or local data acquisition. In some cases, the vehicle telemetry sensors may beneficially enable monitoring and transmitting data about a vehicle's proximity and relationship to other objects (e.g., another vehicle).

In some embodiments, the one or more sensors 110 may comprise specialized weather sensors. These sensors may include any device designed to detect, measure, or monitor environmental conditions such as temperature, humidity, precipitation, wind speed, atmospheric pressure, or other weather-related parameters. For example, specialized weather sensors may be configured to enhance situational awareness or inform operational decisions within the network system 100.

In some instances, the one or more sensors 110 may comprise heat or thermal imaging sensors. These sensors may include any device capable of detecting or measuring thermal energy or temperature variations within a monitored area. These sensors may utilize infrared, thermocouple, or other technologies to identify heat signatures, support object detection, or enable other types of environmental monitoring under various conditions.

In some cases, the one or more sensors 110 may comprise 3D imaging sensors. These sensors may include any device or system capable of capturing three-dimensional spatial data, including but not limited to stereoscopic cameras, structured light sensors, or time-of-flight sensors. In some cases, the 3D imaging sensors beneficially enable mapping of three-dimensional spaces (e.g., the curvature of a road), enabling advanced recognition, reconstruction, and analysis of objects and scenes.

In some embodiments, the one or more sensors 110 may comprise augmented reality (AR) sensors. These sensors may include any device or system capable of capturing, detecting, or measuring data that enables the overlay of digital information onto a physical environment. These devices or systems may comprise cameras, depth sensors, inertial measurement units (IMUs), and environmental sensors.

In some instances, the one or more sensors 110 may comprise virtual reality (VR) sensors. These sensors may include any device or system capable of capturing, detecting, or measuring data that enables the creation or manipulation of immersive digital environments. These devices or systems may comprise motion tracking sensors, gyroscopes, accelerometers, haptic feedback devices, and spatial mapping sensors. For example, the virtual reality sensors may be configured for monitoring user movements, gestures, and interactions.

In some cases, the one or more sensors 110 may comprise chemical sensors. These sensors may include any device or system capable of detecting, capturing, or measuring the presence, concentration, or composition of chemical substances within a monitored environment. These devices or systems may comprise smoke, electrochemical, optical, semiconductor, gas, and biological sensors. For example, the chemical sensors may be configured for detecting and analyzing chemical substances in an event venue or on a public road.

The different embodiments of the one or more sensors 110 disclosed herein are exemplary embodiments only.

The raw data from the one or more sensors 110 can comprise a substantially real-time data and may be subjected to a series of data conditioning including sophisticated signal processing and image optimization operations within the analytics server system 105 and/or the intelligence server 138. This step beneficially refines the raw data before it is analyzed.

A relevant process comprised in the data conditioning is noise reduction, which filters out random fluctuations in the raw data caused by, for example, low light or high sensor gain. Computing processes such as spatial and temporal filtering can be applied to create a cleaner image with less grain, improving the accuracy of subsequent AI and ML operations. For visual data captured with IR illumination, specialized algorithms can enhance the contrast and detail of heat signatures, making it easier to classify and identify objects.

In addition, the data conditioning phase may employ advanced computational photography techniques. This can include High Dynamic Range (HDR) imaging, where multiple images of a given scene (e.g., a captured view by the one or more sensors 110) are captured at different exposures and then combined to create a single image with detail in both the brightest and darkest areas. Additionally, image stitching can be used to combine multiple images from different sensors comprised in the one or more sensors into a single, comprehensive view of the scene, providing a wider field of view. The intelligence server 138 can also apply real-time image enhancement and sharpening filters to make the raw data more suitable for specific analytical tasks, such as facial recognition or object tracking, ensuring that every piece of data is optimized for its intended purpose.

The operational nature of the sensors 110 may vary, encompassing static and dynamic implementations. In some embodiments, the sensors 110 may be static, fitted to a fixed structure and secured to prevent any movement, such as a sensor permanently bolted to an elongated frame to monitor a given area on a roadway. Other static sensors may be fitted to a fixed structure but secured in a way that allows for movement. One such sensor may be a pan-tilt-zoom (PTZ) camera mounted on the exterior of a given area that can be remotely controlled to observe various angles of said area or follow objects of interest. In further embodiments, the sensors 110 may be dynamic, fitted to moving platforms or vehicles. Examples of such dynamic sensors include those mounted on unmanned aerial vehicles (drones), inspection sensors affixed to autonomous delivery robots or other vehicles in a given location, or sensors integrated into vehicles.

In an exemplary implementation, the one or more sensors 110 (e.g., image capture sensors) comprise synchronized or unsynchronized cameras with or without an overlapping field of view. For example, the synchronized or unsynchronized cameras may be configured to monitor an area of a roadway including or excluding a lane of the roadway that is divided into n-regions with each region being monitored by one or more synchronized or unsynchronized cameras. Furthermore, each of the synchronized or unsynchronized cameras can comprise a high-angle camera configured to provide a clear view of an object (e.g., a vehicle) in its field of view such that images of the object can be analyzed from an optimal perspective. In addition, the disclosed one or more sensors 110 may be configured to implement occlusion mitigation computing operations that correct, compensate, or mitigate against negative effects of undesirable objects blocking the field of view of said one or more sensors.

It is appreciated that the one or more endpoint devices 125*a* . . . 125*n* can comprise handheld computing devices, smart phones, tablets, phablets, laptop computers, desktop computers, personal digital assistants (PDAs), smart devices, wearable electronic devices, biometric devices, computer servers, virtual servers, virtual machines, and/or communication servers. In some embodiments, the one or more endpoint devices 125*a* . . . 125*n* may include a plurality of computing devices configured to communicate with one another and/or receive/transmit data communications from/to the analytics server system 105 and/or the intelligence server 138. In some instances, one or more alert data communications (e.g., the aforementioned alerts) associated with executing one or more of the disclosed methods may be visualized on one or more display devices of the one or more endpoint devices 125*a* . . . 125*n*. In some cases, the one or more endpoint devices comprise a first endpoint device that is associated with the analytics server system 105. This first endpoint device, for example, can comprise an admin endpoint device configured to monitor, control, or otherwise regulate or validate various computing operations implemented in the network system 100. Furthermore, the one or more endpoint devices 125*a* . . . 125*n* can include a second endpoint device that may be dependent or independent from the analytics server system 105. This second endpoint point device, for example, may be associated with a security or monitoring system configured to support or implement security operations or vehicular traffic management based on analyzing captured image data. It is also appreciated that the one or more endpoint devices 125*a* . . . 125*n* may include and/or are associated with the one or more sensors 110.

The output system 120 of FIG. 1, is adaptable to interface with, and drive one or more sensor interfaces using data or control logic that may be either dependent on or independent of the computing operations performed by the disclosed methods and systems. For example, the output system 120 may incorporate a visual subsystem, such as a graphical display device including but not limited to liquid crystal displays (LCDs), light-emitting diode (LED) displays, organic light-emitting diode (OLED) displays, or touch-screen interfaces, configured to render data alerts, notifications, graphical representations, or other electronic indicia derived from or responsive to the outcomes of the disclosed computing operations. Additionally, the output system 120 may integrate an audio subsystem, exemplified by speakers, transducers, or audio amplifiers, capable of generating audio data such as tones, voice prompts, or synthesized speech in response to input data or control logic stemming from, or independent of the disclosed methods. Furthermore, the output system 120 can encompass vibration-based mechanisms, such as eccentric rotating mass (ERM) motors or linear resonant actuators (LRAs), embedded within various apparatuses including automotive steering wheels, handheld mobile computing devices, wearable electronic watches, or tablet computing devices, to deliver tactile alerts or feedback patterns triggered by processed data or logic resulting from one or more of the disclosed methods.

In some embodiments, the output system 120 is configured to activate a haptic feedback subsystem, employing vibration sensors, piezoelectric elements, or similar haptic actuators to provide nuanced tactile sensations, such as variable intensity vibrations or directional cues, in response to data or control logic generated post-execution of one or more of disclosed methods. Moreover, the output system 120 may include embedded control logic designed to regulate environmental conditioning systems, thereby modulating parameters like ambient temperature via heating or cooling elements, atmospheric pressure through pressurization valves or compressors, or humidity levels using humidifiers, dehumidifiers, or evaporative systems, all in accordance with the computational results or directives associated with the disclosed methods and systems. Additionally, the output system 120 can incorporate control logic for operating a radio transmitter, facilitating the transmission of electrical or electromagnetic data-such as processed sensor readings, analytical insights, or command signals—to key interconnected systems depicted in FIG. 1, including but not limited to the analytics server 105, the intelligence server 138, and the endpoint devices 125*a* . . . 125*n* via protocols such as Wi-Fi, Bluetooth, cellular networks, or other wireless and/or wired communication standards.

In some embodiments, the output system 120 may be comprised in, or associated with one or more of the analytics server 105, the intelligence server 138, and the endpoint devices 125*a* . . . 125*n*. In some cases the output system 120 is proximal to one or more of analytics server 105, the intelligence server 138, and the endpoint devices 125*a* . . . 125*n*. For example, the output system may be comprised in, for example, a vehicle associated with the analytics server 105, the intelligence server 138, and the endpoint devices 125*a* . . . 125*n*.

System Environment

FIGS. 2 and 3 illustrate exemplary system and functional diagrams of a computing environment 200, within which one or more systems shown in FIG. 1 can be implemented. Specifically, FIG. 2 provides a system diagram of the computing environment, whereas FIG. 3 provides a detailed functional diagram of the computing environment 200.

The computing environment 200 may include a processing unit 202, a memory unit 204, an I/O unit 206, and a communication unit 208. The processing unit 202, the memory unit 204, the I/O unit 206, and the communication unit 208 may include one or more subunits for performing operations described in this disclosure. Additionally, each unit and/or subunit may be operatively and/or otherwise communicatively coupled with each other and to the network 115 of FIG. 1. The computing environment 200 may be implemented on general-purpose hardware and/or specifically-purposed hardware as the case may require.

The processing unit 202 may control one or more of the memory unit(s) 204, the I/O unit 206, and the communication unit 208 of the computing environment 200, as well as any included subunits, elements, components, devices, and/or functions performed by the memory unit 204, I/O unit 206, and the communication unit 208. The described subelements of the computing environment 200 may also be included in similar fashion in any of the other units and/or devices included in the network system 100 of FIG. 1. Additionally, any actions described as being performed by a processor may be executed by the processing unit 202 of FIG. 2 alone and/or by the processing unit 202 in conjunction with one or more additional processors, units, subunits, elements, components, devices, and/or the like. For example, the processing unit 202 may be configured to implement computing instructions that process or otherwise analyze received image, video, or other data from the one or more sensors discussed above.

Further, while one processing unit 202 may be shown in FIG. 2, multiple processing units may be present and/or otherwise included in the computing environment 200 or elsewhere in the network system 100 of FIG. 1. Thus, while instructions may be described as being executed by the processing unit 202 (and/or various subunits of the processing unit 202), the instructions may be executed simultaneously, serially, and/or otherwise by one or multiple processing units 202 on one or more computing devices.

In some embodiments, the processing unit 202 may be implemented as one or more computer processing unit (CPU) chips and/or graphical processing unit (GPU) chips and may include a hardware device capable of executing computer instructions. The processing unit 202 may execute instructions, codes, computer programs, and/or scripts. The instructions, codes, computer programs, and/or scripts may be received from and/or stored in the memory unit 204, the I/O unit 206, the communication unit 208, subunits, and/or elements of the aforementioned units, other devices, and/or computing environments, and/or the like.

In some embodiments, the processing unit 202 may include, among other elements, subunits such as a content management unit 212, a location determination unit 214, a graphical processing unit (GPU) 216, and a resource allocation unit 218. Each of the aforementioned subunits of the processing unit 202 may be communicatively and/or otherwise operably coupled with each other.

The content management unit 212 may facilitate generation, modification, analysis, transmission, and/or presentation of content. Content may be file content, media content, image content, video content, textual content, audio-visual content, or any combination thereof. In some instances, content on which the content management unit 212 may operate includes device information, user interface data, images, text, themes, audio files, video files, documents, and/or the like. Additionally, the content management unit 212 may control (e.g., format) the audio-visual environment and/or appearance of application data during execution of various processes. In some embodiments, the content management unit 212 may interface with a third-party content server and/or memory location for execution of its operations.

The location determination unit 214 may facilitate detection, generation, modification, analysis, transmission, and/or presentation of location information. Location information may include global positioning system (GPS) coordinates, an Internet protocol (IP) address, a media access control (MAC) address, geolocation information, a port number, a server number, a proxy name and/or number, device information (e.g., a serial number), an address, a zip code, and/or the like. In some embodiments, the location determination unit 214 may include various sensors, radar, and/or other specifically-purposed hardware elements for the location determination unit 214 to acquire, measure, and/or otherwise transform location information. The location determination unit 214 may be associated with the one or more sensors 110, discussed above.

The GPU 216 may facilitate generation, modification, analysis, processing, transmission, and/or presentation of content described above, as well as any data such as pipeline data or analysis data or other output data generated using at least a file and/or the like. In some embodiments, the GPU 216 may be used to render content for presentation on a computing device via, for example, a graphical display device or a graphical user interface (GUI) of a display device of the endpoint device 125*a*. The GPU 216 may also include multiple GPUs and therefore may be configured to perform and/or execute multiple processes in parallel.

The resource allocation unit 218 may facilitate the determination, monitoring, analysis, and/or allocation of computing resources throughout the computing environment 200 and/or other computing environments. For example, the computing environment may facilitate a high volume of data to be processed and analyzed. As such, computing resources of the computing environment 200 used by the processing unit 202, the memory unit 204, the I/O unit 206, and/or the communication unit 208 (and/or any subunit of the aforementioned units) such as processing power, data storage space, network bandwidth, and/or the like may be in high demand at various times during operation. Accordingly, the resource allocation unit 218 may include sensors and/or other specially-purposed hardware for monitoring performance of each unit and/or subunit of the computing environment 200, as well as hardware for responding to the computing resource needs of each unit and/or subunit. In some embodiments, the resource allocation unit 218 may use computing resources of a second computing environment separate and distinct from the computing environment 200 to facilitate a desired operation. For example, the resource allocation unit 218 may determine a number of simultaneous computing processes and/or requests. The resource allocation unit 218 may also determine that the number of simultaneous computing processes and/or requests meet and/or exceed a predetermined threshold value. Based on this determination, the resource allocation unit 218 may determine an amount of additional computing resources (e.g., processing power, storage space of a particular non-transitory computer-readable memory medium, network bandwidth, and/or the like) required by the processing unit 202, the memory unit 204, the I/O unit 206, the communication unit 208, and/or any subunit of the aforementioned units for safe and efficient operation of the computing environment while supporting the number of simultaneous computing processes and/or requests. The resource allocation unit 218 may then retrieve, transmit, control, allocate, and/or otherwise distribute determined amount(s) of computing resources to each element (e.g., unit and/or subunit) of the computing environment 200 and/or another computing environment.

The memory unit 204 may be used for storing, recalling, receiving, transmitting, and/or accessing various files and/or data during operations within the computing environment 200. In one embodiment, the memory unit 204 stores instructions, code, and/or data that may be executed by the processing unit 202. For instance, the memory unit 204 may store code that execute operations associated with one or more units and/or one or more subunits of the computing environment 200. For example, the memory unit may store code for the processing unit 202, the I/O unit 206, the communication unit 208, and for itself. Moreover, the memory unit may store code for implementing the data unit 136 associated with the analytics server system 105. Furthermore, the memory unit 204 can also be used to store one or more computing models, relationship record(s) associated with category data determined during, for example, classification computing operations executed on a captured substantially real-time data using the one or more sensors. The category data, for example, can be linked to, or characterize features of objects imaged using the one or more sensors.

Turning back to FIGS. 2 and 3, the memory unit 204 may include various types of data storage media such as solid-state storage media, hard disk storage media, virtual storage media, and/or the like. Memory unit 204 may include dedicated hardware elements such as hard drives and/or servers, as well as software elements such as cloud-based storage drives. In some implementations, memory unit 204 may include a random-access memory (RAM) device, a dynamic random-access memory (DRAM) device, a static random-access memory (SRAM) device, flash memory, read only memory (ROM) device, and/or various forms of secondary storage. The RAM device may be used to store volatile data and/or to store instructions that may be executed by the processing unit 202. For example, the instructions stored by the RAM device may be a command, a current operating state of computing environment 200, an intended operating state of computing environment 200, and/or the like. As a further example, data stored in the RAM device of memory unit 204 may include instructions related to various methods and/or functionalities described in this disclosure. The ROM device may be a non-volatile memory device that may have a smaller memory capacity than the memory capacity of a secondary storage. The ROM device may be used to store instructions and/or data that may be read during execution of computer instructions. In some embodiments, access to both the RAM device and ROM device may be faster to access than the secondary storage.

Secondary storage may comprise one or more disk drives and/or tape drives and may be used for non-volatile storage of data or as an over-flow data storage device if the RAM device is not large enough to hold all working data. Secondary storage may be used to store programs that may be loaded into the RAM device when such programs are selected for execution. In some embodiments, the memory unit 204 includes one or more databases 210 for storing any data described herein. For example, depending on the implementation, the one or more databases 210 may be used as the local computing database 111*a* or remote computing database 111*b* associated with the analytics server system 105. In some embodiments, the memory unit 204 and/or its subunits may be local relative to the analytics server system 105 and/or be remotely located relative to the analytics server system 105.

The memory unit 204 may include subunits such as an operating system unit 226, an application data unit 228, an application programming interface (API) unit 230, a content storage unit 232, and a cache storage unit 240. Each of the aforementioned subunits of the memory unit 204 may be communicatively and/or otherwise operably coupled with each other and other units and/or subunits of the computing environment 200. It is also noted that the memory unit 204 may include other modules, instructions, or code that facilitate the execution of the techniques described. For instance, the memory unit 204 may include the data unit 136 and the intelligence unit 140. The data unit 136 and/or intelligence unit 140 may be configured to implement one or more of the disclosed computing methods or operations. According to one embodiment, the data unit 136 and/or the intelligence unit 140 comprise one or more of a analytic data flux processor (ADFP), a cognitive data orchestration unit (CDOU), an insight generation hypervisor (IGH), a metric derivation computational fabric (MDCF), a phenomenological data synthesizer (PDS), a quantitative intelligence abstraction engine (QIAE), an adaptive data analytics core (ADAC), a contextual insight graph engine (CIGE), an empirical data transformation array (EDTA), or a heuristic data pattern extractor (HDPE).

The operating system unit 226 may facilitate deployment, storage, access, execution, and/or utilization of an operating system used by computing environment 200 and/or any other computing environment described in this disclosure. In some embodiments, operating system unit 226 may include various hardware and/or software elements that serve as a structural platform for the processing unit 202 to execute various operations described herein. Operating system unit 226 may further store various pieces of information and/or data associated with the operation of the operating system and/or computing environment 200 as a whole, such as a status of computing resources (e.g., processing power, memory availability, resource utilization, and/or the like), runtime information, modules to direct execution of operations described herein, user permissions, security credentials, and/or the like.

The application data unit 228 may facilitate deployment, storage, access, execution, and/or utilization of an application used by computing environment 200 and/or any other computing environment described herein. For example, an endpoint device (e.g., endpoint device 125*a*) may be required to download, install, access, and/or otherwise use a software application (e.g., web application) to facilitate performance of one or more of the disclosed computing operations. As such, application data unit 228 may store any information and/or data associated with an application. Application data unit 228 may further store various pieces of information and/or data associated with the operation of an application and/or computing environment 200 as a whole, such as a status of computing resources (e.g., processing power, memory availability, resource utilization, and/or the like), runtime information, user interfaces, modules to direct execution of operations described herein, user permissions, security credentials, and/or the like.

The API unit 230 may facilitate deployment, storage, access, execution, and/or use of information associated with APIs of computing environment 200 and/or any other computing environment described in this disclosure. For example, computing environment 200 may include one or more APIs for various devices, applications, units, subunits, elements, and/or other computing environments to communicate with each other and/or use the same data. Accordingly, API unit 230 may include API databases containing information that may be accessed and/or used by applications, units, subunits, elements, and/or operating systems of other devices and/or computing environments. In some embodiments, each API database may be associated with a customized physical circuit included in memory unit 204 and/or API unit 230. Additionally, each API database may be public and/or private, and so authentication credentials may be required to access information in an API database. In some embodiments, the API unit 230 may enable the analytics server system 105 and/or the display device of the endpoint device 125*a* to communicate with each other.

The content storage unit 232 may facilitate deployment, storage, access, and/or utilization of information associated with performance of the disclosed operations by computing environment 200 and/or any other computing environment described. In some embodiments, content storage unit 232 may communicate with content management unit 212 to receive and/or transmit content files (e.g., media content, image data, video data, audio-visual data, visualization data, etc.).

The cache storage unit 240 may facilitate short-term deployment, storage, access, analysis, and/or use of data. In some embodiments, cache storage unit 240 may serve as a short-term storage location for data so that the data stored in cache storage unit 240 may be accessed quickly. In some instances, cache storage unit 240 may include RAM devices and/or other storage media types for quick recall of stored data. Cache storage unit 240 may include a partitioned portion of storage media included in memory unit 204.

The I/O unit 206 may include hardware and/or software elements for the computing environment 200 to receive, transmit, and/or present information useful for performing processes described herein. For example, elements of the I/O unit 206 may be used to receive input from the analytics server system 105. As described, I/O unit 206 may include subunits such as an I/O device 242, an I/O calibration unit 244, and/or driver 246.

The I/O device 242 may facilitate receipt, transmission, processing, presentation, display, input, and/or output of information as a result of executed processes described in this disclosure. In some embodiments, the I/O device 242 may include a plurality of I/O devices. In some embodiments, I/O device 242 may include a variety of elements that enable a user to interface with computing environment 200. For example, I/O device 242 may include a keyboard, a touchscreen, a button, a sensor, a biometric scanner, a laser, a microphone, a camera, and/or another element for receiving and/or collecting input from a user. Additionally, and/or alternatively, I/O device 242 may include a display, a screen, a sensor, a vibration mechanism, a light emitting diode (LED), a speaker, a radio frequency identification (RFID) scanner, and/or another element for presenting and/or otherwise outputting data to a user. In some embodiments, the I/O device 242 may communicate with one or more elements of processing unit 202 and/or memory unit 204 to execute the disclosed operations.

The I/O calibration unit 244 may facilitate the calibration of the I/O device 242. For example, I/O calibration unit 244 may detect and/or determine one or more settings of I/O device 242 and then adjust and/or modify settings and/or format and/or optimize viewing of a graphical user interface and/or one or more visualizations associated with alerts or alert data communications. According to some embodiments, the I/O calibration unit 244 may be used to format or resolve, for example, data communications such as alerts or data reports into multidimensional data components (e.g., multi-modal data including multiple aspects such as image data, video data, textual data, etc.) and rendering the multidimensional data components on a display device.

In some embodiments, the I/O calibration unit 244 may use a driver 246 (or multiple drivers) to calibrate I/O device 242. For example, driver 246 may include software that is installed by I/O calibration unit 244 so that an element of computing environment 200 (or an element of another computing environment) may recognize and/or integrate with I/O device 242 for disclosed processes.

The communication unit 208 may facilitate establishment, maintenance, monitoring, and/or termination of data communications (e.g., control or alert data communications) between computing environment 200 and other computing environments, third party server systems, and/or the like. Communication unit 208 may also facilitate internal communications between various elements (e.g., units and/or subunits) of computing environment 200. For example, the communication unit 208 may be configured to receive substantially real-time data from one or more of the one or more sensors 110 as well as coordinate the transmission and/or storage of any attendant data such as analysis reports associated with analyzing the substantially real-time data, instructions and/or data to the one or more output system 120, and/or any alerts to stakeholders with one or more endpoint devices. In some embodiments, communication unit 208 may include a network protocol unit 248, an API gateway 250, an encryption unit 252, and/or a communication device 254. Communication unit 208 may include hardware and/or software elements.

The network protocol unit 248 may facilitate establishment, maintenance, and/or termination of a communication connection for computing environment 200 by way of a network. For example, the network protocol unit 248 may detect and/or define a communication protocol required by a particular network and/or network type. Communication protocols used by the network protocol unit 248 may include Wi-Fi protocols, Li-Fi protocols, cellular data network protocols, Bluetooth® protocols, WiMAX protocols, Ethernet protocols, powerline communication (PLC) protocols, and/or the like. In some embodiments, facilitation of communication for computing environment 200 may include transforming and/or translating data from being compatible with a first communication protocol to being compatible with a second communication protocol. In some embodiments, network protocol unit 248 may determine and/or monitor an amount of data traffic to consequently determine which particular network protocol is to be used for establishing a secure communication connection, transmitting data, and/or performing the disclosed methods and/or data visualization operations and/or other processes provided in this disclosure.

The API gateway 250 may allow other devices and/or computing environments to access API unit 230 of memory unit 204 of computing environment 200. For example, display devices associated with the various systems of FIG. 1 may access API unit 230 of computing environment 200 via API gateway 250. In some embodiments, API gateway 250 may be required to validate user credentials associated with a user of a display device prior to providing access to API unit 230 to a user. API gateway 250 may include instructions for computing environment 200 to communicate with another device and/or between elements of the computing environment 200.

The encryption unit 252 may facilitate translation, encryption, encoding, decryption, and/or decoding of information received, transmitted, and/or stored by the computing environment 200. Using encryption unit 252, each transmission of data may be encrypted, encoded, and/or translated for security reasons, and any received data may be encrypted, encoded, and/or translated prior to its processing and/or storage. In some embodiments, encryption unit 252 may generate an encryption key, an encoding key, a translation key, and/or the like, which may be transmitted along with any data content.

The communication device 254 may include a variety of hardware and/or software specifically purposed to facilitate communication for computing environment 200. In some embodiments, communication device 254 may include one or more radio transceivers, chips, analog front end (AFE) units, antennas, processing units, memory, other logic, and/or other components to implement communication protocols (wired or wireless) and related functionality for facilitating communication for computing environment 200. Additionally and/or alternatively, communication device 254 may include a modem, a modem bank, an Ethernet device such as a router or switch, a universal serial bus (USB) interface device, a serial interface, a token ring device, a fiber distributed data interface (FDDI) device, a wireless local area network (WLAN) device and/or device component, a radio transceiver device such as code division multiple access (CDMA) device, a global system for mobile communications (GSM) radio transceiver device, a universal mobile telecommunications system (UMTS) radio transceiver device, a long term evolution (LTE) radio transceiver device, a worldwide interoperability for microwave access (WiMAX) device, and/or another device used for communication purposes.

Figure 4:
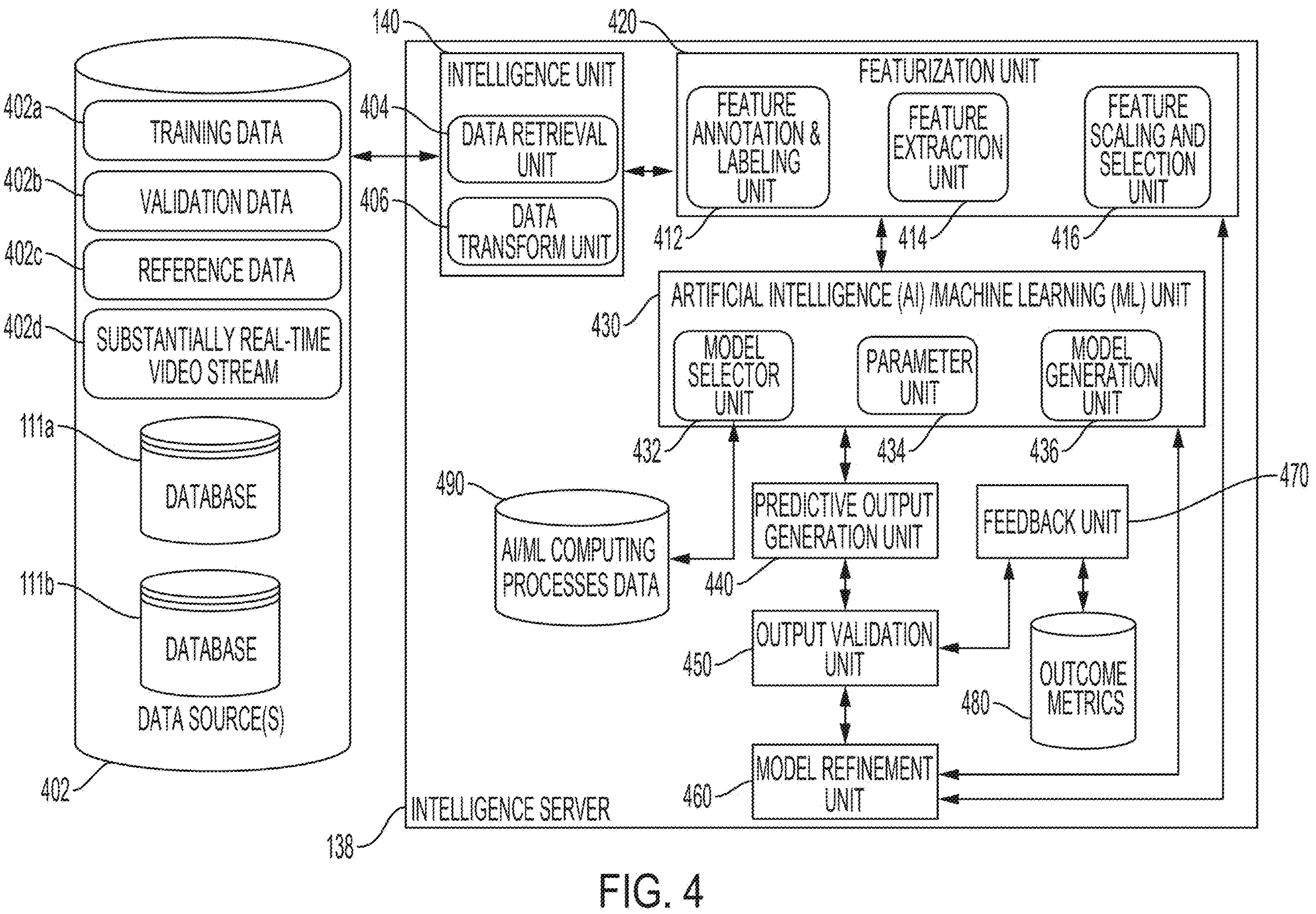
FIG. 4 shows an exemplary communicative coupling of the intelligence server 138 to one or more data sources.

FIG. 4 shows an exemplary communicative coupling of the intelligence server 138 to one or more data sources. In the illustrated implementation, the intelligence server 138 comprises the above-referenced intelligence unit 140 that can include a data retrieval unit 404 and data transform unit 406. Data retrieval unit 404 may be configured to access, assess, interpret, request, or receive data, which may be adjusted, reformatted, or changed. For example, data retrieval unit 404 may request data from a remote source (e.g., data from the one or more sensors 110 and/or databases 111*a* and 111*b* of the analytics server system 105) using an API. Thus, the intelligence unit 140 may be configured to access, interpret, request, format, re-format, or receive input data from the one or more data sources outlined in data source(s) 402. For example, intelligence unit 140 may be configured to use data transform unit 406 to execute a re-configuration or other data changes or data transformations, such as a data dimension reduction prior to the analytics server 105 running intelligence computing operations on said transformed data. Data source(s) 402 may comprise real-time or near real-time captured data that is stored on one or more memories devices such as those discussed in association with FIGS. 2 and 3. In some embodiments, data source(s) 402 may be associated with a single entity (e.g., a single computing network) or with multiple entities (e.g., multiple computing networks). Data source(s) 402 may include one or more of training data 402*a* (e.g., input data to feed a machine learning model as part of one or more training processes), validation data 402*b* (e.g., data against which at least one processor may compare model output with, such as to determine model output quality), reference data 402*c*, and/or a substantially real-time video stream 402*d*. In some embodiments, intelligence unit 140 can be implemented using at least one computing device. For example, data from data sources 402 can be obtained through one or more I/O devices and/or network interfaces. Further, the received data may be stored (e.g., during execution of one or more operations) in a suitable storage or system memory. Intelligence unit 140 may also be configured to interact with a memory unit (e.g., memory unit 204), which may be implemented on a computing device that stores data in a storage device.

In some embodiments, intelligence unit 140 comprises an executable software module containing one or more instructions or computer-executable logic. These instructions are specifically configured to be executed by one or more processors, such as the processors discussed in association with FIGS. 2 and 3, to perform computing operations of the intelligence server 138 including coordinating with the various units of the intelligence server 138 to perform intelligent computing operations.

The intelligence server 138 may also include machine learning (ML) modeling unit 430, which may be configured to execute one or more modeling computing operations on an AI or ML model (e.g., model training, model re-configuration, model validation, model testing), such as those described in the processes described herein. For example, the ML modeling unit 430 may execute an operation to train an AI or ML model, such as adding, removing, or modifying a model parameter. Training of an AI or ML model may be supervised, semi-supervised, or unsupervised. In some embodiments, training of an AI or ML model may include multiple epochs, or passes of data (e.g., training data 402*a*) through an AI or ML model process (e.g., a training process). In some embodiments, different epochs may have different degrees of supervision (e.g., supervised, semi-supervised, or unsupervised).

Training data for a given AI or ML model under consideration may include input data (e.g., as described above) and/or data previously output from a model (e.g., forming recursive learning feedback). A model parameter may include one or more of a seed value, a model node, a model layer, a computing process, a function, a model connection (e.g., between other model parameters or between models), a model constraint, or any other digital component influencing the output of a model. A model connection may include or represent a relationship between model parameters and/or disparate models, which may be dependent or interdependent, hierarchical, and/or static or dynamic. The combination and configuration of the model parameters and relationships between model parameters discussed herein can be cognitively infeasible for the human mind to maintain or use. Without limiting the disclosed embodiments in any way, an ML or AI model may include millions, trillions, or even billions of model parameters.

ML modeling unit 430 may include model selector unit 432 (e.g., configured to select a model from among a plurality of models, such as based on input data), parameter selector unit 434 (e.g., configured to add, remove, and/or change one or more parameters of a model), and/or model generation unit 436 (e.g., configured to generate one or more machine learning models, such as according to model input data, model output data, comparison data, and/or validation data). In some embodiments, model selector unit 432 may be configured to receive input and/or transmit output to AI/ML computing processes database 490. AI/ML computing processes database 490 may store one or more AI/ML models, any of which may be fully trained, partially trained, or untrained. In one embodiment, an AI/ML model may be, or include, without limitation, one or more of (e.g., such as in the case of a metamodel) a statistical model, a complex computing process, a neural network (NN), a convolutional neural network (CNN), a generative neural network (GNN), a Word2Vec model, a bag of words model, a term frequency-inverse document frequency model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, a You Only Look Once (YOLO) computing model. A YOLO model, for example, can be used to efficiently detect and bound an object within the image data using, for example, a bounding box. Further, each of the bounding boxes for a detected object may comprise minimum coordinates and maximum coordinates. The minimum and maximum coordinates can represent the coordinates of two diagonally opposite corners of a given bounding box. In one embodiment, the minimum coordinates can correspond to the top-left corner of the bounding box, while the maximum coordinates correspond to the bottom-right corner of the bounding box. Furthermore, the intelligence server 138 may be configured to measure the relative angle between the two bounding boxes associated with a given image data and thereby track the movement of the vehicles on a roadway. The relative angle may be generated using a straight line connecting either the minimum coordinates or the maximum coordinates of the two bounding boxes.

By processing images in real-time using the disclosed models, the disclosed system becomes a high-accuracy vehicle detection system, making it suitable for applications such as real-time traffic monitoring. Other intelligent computing processes such as SSD (Single Shot MultiBox Detector) computing processes, Faster R-CNN computing processes, RetinaNet computing processes, and the like can be employed for the vehicles detection and bounding, to efficiently track the movement of the vehicles on the roadway.

Intelligence server 138 can further include predictive output generation unit 440, output validation unit 450 (e.g., configured to apply validation data to machine learning model output), feedback unit 470 (e.g., configured to apply feedback to a model), and model refinement unit 460 (e.g., configured to update or re-configure a model). In some embodiments, feedback unit 470 may receive input and/or transmit output (e.g., output from a trained, partially trained, or untrained model) to outcome metrics database 480. Outcome metrics database 480 may be configured to store output from one or more models and may also be configured to associate output with one or more models. In some embodiments, outcome metrics database 480, or other device (e.g., model refinement unit 460 or feedback unit

470) may be configured to correlate output, detect trends in output data, and/or infer a change to input or model parameters to cause a particular model output or type of model output. In some embodiments, model refinement unit 460 may receive output from predictive output generation unit 440 or output validation unit 450. In some embodiments, model refinement unit 460 may transmit the received output to featurization unit 420 or ML modeling unit 430 in one or more iterative cycles.

Any or each unit of intelligence server 138 may comprise a computing unit or a data unit, which may be a packaged functional hardware unit designed for use with other components or a part of a program that implements specific computing operations. Any or each computing unit may be implemented using a computing environment such as those discussed in conjunction with FIGS. 2 and 3. In some embodiments, the functionality of intelligence server 138 may be split across multiple computing environments to allow for distributed processing of the data, which may improve output speed and reduce computational load on individual computing environments. In some embodiments, intelligence server 138 may use load-balancing to maintain stable resource loads (e.g., processing load, memory load, or bandwidth load) across multiple computing environments and to reduce the risk of a computing environment from becoming overloaded. In these or other embodiments, the different components may communicate over one or more I/O devices and/or network interfaces.

It is appreciated that the intelligence server 138 can beneficially facilitate implementing one or more computing operations associated with the network system 100 of FIG. 1. In effect, the intelligence server 138 provides the computational backbone for complex, single, or multi-stage intelligence computing processes. It is appreciated that the intelligence server 138 can ingest a substantially real-time data from multiple sensors which can be used in an object detection, and/or establishing data indicative of proximity and contact dynamics assessment between two objects (e.g., two vehicles), where an AI model of the intelligence server 138, identifies and draws a bounding box (e.g., a structure that can surround an object in an image) around each object (e.g., vehicles) comprised in the captured substantially real-time data. Following detection, the intelligence server 138 may perform various computing operations to classify consistent identifiers to each identified object in the substantially real-time data across successive image frames within a single view of one or more sensors 110. This addresses challenges like temporary occlusion, where an object is briefly hidden from view. The intelligence server 138's processing power and architecture enables these computationally intensive tasks to happen quickly and accurately, allowing for the classification and identification of objects on a roadway.

In some embodiments, the intelligence server 138 can analyze the spatial and temporal (e.g., spatiotemporal) relationships between an identified object (e.g., a vehicle) and other objects comprised in the data components of the substantially real-time data. This can involve a deeper layer of AI and/or ML computing operations to infer the nature of the object relationships in the image data. For example, if the intelligence server 138 detects a data object near an object like "a door," "a car," "a house," "a tree," etc., it might use a trained model of the intelligence server 138 to recognize an action of a given data object such as "opening the door," "entering the car," "leaving a house," "climbing the tree," etc. Thus, the intelligence server 138 is not only configured for detecting just data objects. Rather, the intelligence server 138 can be implemented to substantially determine a complete semantic description of an interaction between a given data object and other data objects (e.g., data objects comprising pixel representations of organic or inorganic objects in the real world). This allows the intelligence server 138 to recognize and classify a wide range of actions, providing a nuanced understanding of a camera scene comprised in a substantially real-time video stream by identifying not just what is present in the scene, but also what is happening within the scene. It is appreciated that a first data object, a second data object, a third data object, etc., comprised in a substantially real-time video stream may be classified into first category data, second category data, third category data, etc., by the intelligence server 138.

Embodiments

In some embodiments, the disclosed systems and methods relate to an autonomous AI-driven emergency response system (e.g., 911 Agent) that conducts real-time voice interaction with callers, extracts critical information, classifies the type and severity of emergencies, and/or generates regulatory-compliant incident documentation. Furthermore, in other embodiments, the disclosed systems and methods integrate a hybrid architecture combining an LLM-based planning module, a retrieval-augmented generation (RAG) engine, a dual synced and unsynced audio-processing pipeline, and/or a real-time decision engine. In some cases, these components enable the agent to perform caller guidance, triage, department detection, escalation decisions, and/or structured report generation without human dispatchers.

Key capabilities of the disclosed system and methods may include at least one of: real-time RAG-powered guidance, automatic extraction of emergency data (e.g., location, hazard signals, victim condition, event severity, number of individuals involved, etc.), etc. According to one embodiment, the disclosed systems and methods may continuously (e.g., at least partially continuously, every few seconds, at a set time interval, etc.) detect and/or classify emergency intent (e.g., self-harm, medical incidents, fires, violent events, environmental hazards, etc.). In another embodiment, the disclosed methods and systems may comprise at least one of: a dual synced and unsynced signal fusion pipeline, an emergency severity scoring engine, a missing critical information detector, anxiety and stress sensitivity modeling, noise and hazard sound classification, dynamic RAG source prioritization, or fragmented-call timeline reconstruction. According to yet another embodiment, the disclosed methods and systems provide a unified, end-to-end automated workflow for emergency triage.

In some embodiments, the disclosed systems and methods are implemented as a multi-component AI system optimized for real-time emergency call handling under noisy, fragmented, and/or high-stress conditions. According to other embodiments, the system architecture comprises interconnected subsystems comprising at least one of: an LLM planning and dialog management system, a retrieval-augmented generation (RAG) engine, a dual synced and unsynced signal fusion pipeline, a real-time decision and safety engine, a documentation and output generation system, etc.

According to one embodiment, the LLM planning and dialog management system may comprise an LLM that manages real-time dialog with callers and adapts follow-up questions based on extracted information, detected stress levels, emergency type, etc. In another embodiment, the LLM guides the interaction in accordance with emergency-protocol templates retrieved via RAG.

According to yet another embodiment, the retrieval-augmented generation (RAG) engine retrieves relevant emergency-response procedures based on evolving call context. It is appreciated that retrieval may be dynamically prioritized using a context-aware mechanism that weighs factors (e.g., background sounds, severity score, missing information, detected emergency category, etc.). Furthermore, in some cases, fire guidelines, medical protocols, police procedures, etc. may be elevated in response to detected cues.

In still another embodiment, the dual synced and unsynced signal fusion pipeline may comprise an audio-processing system comprising parallel extraction layers (e.g., a synced pipeline and an unsynced pipeline). In a further embodiment, the dual synced and unsynced signal fusion pipeline comprises a two-layer audio-analysis approach in which synchronized speech-to-text data is processed alongside raw, unsynchronized acoustic signals (e.g., noise, stress cues, background events, etc.). According to some embodiments, a synced pipeline processes automatic speech recognition (ASR) transcripts for semantic features, entity extraction, intent classification, etc. It is appreciated that automatic speech recognition (ASR) may comprise a system that converts spoken audio into text for downstream semantic analysis and/or information extraction.

In other embodiments, an unsynced pipeline analyzes raw audio for noise signatures (e.g., fire sounds, alarms, glass breaking), silence patterns, emotional stress markers, respiration irregularities, panic indicators, etc. According to yet other embodiments, a fusion engine combines the synced pipeline and the unsynced pipeline into a unified representation (e.g., using weighted alignment rules). It is appreciated that, the fusion engine may improve accuracy when callers are distressed, interrupted, and/or in loud environments. In some cases, a noise and hazard sound classification comprises an analysis of environmental audio signals (e.g., fire sounds, alarms, crashes, crowd distress, etc.) used to infer the nature of an emergency when speech alone is insufficient.

According to still other embodiments, the real-time decision and safety engine comprises at least one of: an emergency severity scoring engine, a missing critical information detector, an intent classifier, escalation and routing logic, or a timeline reconstruction engine. In one embodiment, the emergency severity scoring engine comprises a computational model that assigns a severity level to an emergency call based on stress indicators, environmental audio cues, urgency keywords, missing information, other extracted signals, etc. Furthermore, in some cases, the emergency severity scoring engine computes a severity level using at least one of: stress intensity, noise level, speech velocity, urgency keywords, contradictions, or environmental signal strength. According to another embodiment, the missing critical information detector monitors completeness of required dispatch data (e.g., location, victim consciousness, number of people involved, hazard type, etc.). It is appreciated that missing fields and/or incomplete data may automatically trigger targeted alerts and/or prompts.

In yet another embodiment, the intent classification module classifies an incident across categories (e.g., self-harm, medical emergencies, fires, police matters, road accidents, environmental hazards, etc.). According to still another embodiment, the escalation and routing logic may select an appropriate response department and/or escalation level based on at least one of: severity score, hazard detection, missing-information analysis, etc. In a further embodiment, the timeline reconstruction engine aligns fragmented utterances, infers event order, and/or reconstructs call progression when the audio is noisy and/or unstable.

According to some embodiments, the documentation and output generation system may generate (e.g., at the end of a call, during a call, etc.) a structured, regulatory-compliant incident report containing relevant data (e.g., caller details, extracted facts, classification outputs, severity score, recommended routing, etc.). It is appreciated that this report may be similar to what human dispatchers traditionally prepare manually.

In some cases, the disclosed methods and systems achieve improved reliability under real emergency conditions due to its multi-layer signal processing, stress-aware dialog adaptation, context-driven retrieval prioritization, and automated safety mechanisms. Furthermore, in other cases, the disclosed methods and systems offer an integrated, autonomous, end-to-end triage workflow that combines guidance, extraction, classification, and escalation. In yet other cases, triage workflow automation comprises an end-to-end automated process through which the system conducts caller interaction, extracts information, performs classification, determines severity, triggers escalation, and generates structured documentation.

The disclosed methods and systems may comprise at least one of the following advantages:

- Improved extraction accuracy in noisy conditions: the dual synced and unsynced audio-processing pipeline may increase reliability (e.g., when calls contain noise, interruptions, distressed speech, etc.).
- Faster and more consistent triage: automated dialog powered by LLM planning and protocol-based RAG retrieval may reduce triage time and ensure uniform questioning across calls.
- Earlier detection of high-risk situations: the emergency severity scoring engine may identify severe and/or escalating events (e.g., using stress indicators, environmental audio cues, urgency keywords, speech patterns, etc.).
- Complete collection of required dispatch information: the missing critical information detector may ensure that essential fields (e.g., location, hazard type, victim status, etc.) are always captured.
- Robust interpretation of environmental signals: hazard-sound classification (e.g., fire, crashes, alarms) may allow the system to infer context even when speech content is limited and/or unclear.
- Adaptive handling of caller distress: emotional-stress sensitivity modeling may improve information gathering from callers experiencing anxiety and/or panic. In some cases, emotional-stress sensitivity modeling comprises detecting levels of caller stress, anxiety, and/or distress from acoustic patterns, tone shifts, speech rate changes, and/or other nonverbal features.
- Unified end-to-end automation: the system may integrate caller interaction, information extraction, severity scoring, routing, escalation, and documentation into a single automated workflow.
- Enhanced operator efficiency and documentation quality: automating routine tasks may reduce dispatcher workload and produce structured, complete, and consistent incident reports.

The disclosed methods and systems provide a measurable improvement in accuracy, safety, and operational reliability. In some cases, the disclosed methods and systems deliver real-time responses using RAG search applied exclusively to trusted and/or curated emergency sources, ensuring that guidance and follow-up questions are both protocol-aligned and verifiably correct.

In other cases, the disclosed methods and systems further incorporate a dual synced and unsynced extraction pipeline, enabling the disclosed methods and systems to capture both semantic information from speech-to-text output and non-verbal acoustic cues (e.g., stress indicators, background hazards, silence patterns, etc.). It is appreciated that the dual synced and unsynced pipeline analysis may produce significantly more reliable interpretations of emergency calls.

According to some embodiments, the disclosed methods and systems comprise an automated alert system, which triggers notifications when required dispatch information is missing and/or when a caller's measured stress level exceeds a predefined threshold. It is further appreciated that the automated alert system may provide a safety-critical function, ensuring that essential data is collected and that escalating emotional distress is detected in real-time (e.g., at least partially real-time).

In other embodiments, the disclosed methods and systems perform intent classification for any harmful and/or dangerous purpose (e.g., self-harm, harm to others, hazardous conditions, emergent threats, etc.). It is also appreciated that the intent classification may operate on both spoken content and unsynced acoustic cues, enabling earlier identification of critical risks. In some cases, the intent classification comprises automated identification of a caller's underlying intent, (e.g., detection of self-harm, harm to others, medical needs, safety threats, other emergency categories, etc.).

According to some embodiments, the disclosed systems and methods may leverage urban intelligence technologies configured to utilize sensor data (e.g., multi-sensor data, real-time data, etc.) from emergency environments. According to other embodiments, an urban intelligence system may use data described herein for computing operations comprising data modeling, adaptive monitoring, data fusion, intent classification, emergency detection, severity scoring, etc. In other embodiments, the disclosed methods may be supported by an urban intelligence computing system configured to acquire, analyze, process, and fuse data streams from emergency callers in physical environments. It is further appreciated that the disclosed methods and systems may be incorporated into an urban intelligence AI-driven architecture configured to utilize an intelligent agent for handling emergency calls.

Exemplary Flowchart

Figure 5:
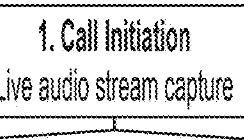
FIG. 5 shows an exemplary workflow associated with an intelligent agentic system for handling an emergency call.

FIG. 5 illustrates an exemplary flowchart for intelligently handling an emergency call. The various blocks of FIG. 5 may be executed in a different order from that shown in FIG. 5. Some blocks may be optional. It is appreciated that one or more data engines stored in one or more memory devices may cause one or more computing device processors to execute the various processing stages of the flowchart of FIG. 5.

At block 1, the method comprises receiving a live (e.g., at least partially real-time) audio stream. According to one embodiment, the live audio stream is associated with an emergency. In another embodiment, the live audio stream comprises at least one of: a phone call, a recording or a transcript. According to yet another embodiment, this may be referred to as the call initiation stage.

At block **2*a***, the method comprises processing the live audio stream. In some embodiments, processing the live audio stream comprises using automatic speech recognition (e.g., to convert the live audio stream to text, to generate a transcript, etc.). According to other embodiments, processing the live audio stream comprises extracting at least one entity or at least one feature (e.g., at least one semantic feature) from the live audio stream. In yet other embodiments, processing the live audio stream comprises determining an intent classification (e.g., a harmful intent classification) associated with the live audio stream (e.g., based on a transcript, based on audio cues, etc.). According to still other embodiments, this may be referred to as the synced pipeline stage.

At block **2*b***, the method comprises analyzing the live audio stream. In some cases, analyzing the live audio stream comprises a raw audio analysis, stress detection, noise detection, hazard detection, etc. In other cases, analyzing the live audio stream comprises determining at least one of: a noise signature, a noise pattern, an environmental hazard indicator, a non-linguistic event classification, an irregularity, a stress indicator, or a panic indicator associated with the live audio stream. In yet other cases, the analyzing the audio stream may occur during and/or after the live audio stream (e.g., while the call is active, after the call has ended, etc.). In still other cases, this may be referred to as the unsynced pipeline stage.

At block 3, the method comprises synchronizing and/or storing the analyzed data and the processed data. According to one embodiment, this may be referred to as the unified call state update stage.

At block 4, the method comprises retrieving data from at least one official emergency source. In another embodiment, the at least one official emergency source comprises a dynamically prioritized (e.g., based on the processed data and/or the analyzed data) retrieval source. According to yet another embodiment, this may be referred to as the trusted retrieval-augmented generation (RAG) retrieval stage.

At block 5, the method comprises planning a response to the live audio stream. In some cases, the response comprises a question and/or caller guidance. In other cases, planning the response to the live audio stream comprises using an intelligence model (e.g., a large language model (LLM)). In yet other cases, planning the response to the live audio stream comprises generating and/or updating emergency data associated with the live audio stream. Furthermore, it is appreciated that the emergency data may comprise at least one of: location data, hazard data, severity data, or state data.

According to one embodiment, the location data comprises or is associated with at least one of: the physical location, global positioning system (GPS) data, or an address. In another embodiment, the hazard data comprises or is associated with at least one of: a hazard type, a medical emergency, a self-harm situation, a fire, an accident, an emergency situation, a terror event, an environmental hazard, or a hazardous condition. In yet another embodiment, the severity data comprises or is based on at least one of: a stress level associated with the first user, an intensity level, a noise level, a speech velocity associated with the first user, or at least one keyword comprised in the first substantially real-time audio stream. According to still another embodiment, the state data comprises or is based on at least one of: a first state associated with the first user, a second state associated with a victim, a third state associated with the physical location, or a number of people at the physical location. It is appreciated that this may be referred to as the LLM planning and response generation stage. It is further appreciated that this stage may comprise at least one of: the slot filling stage (e.g., block 6), the missing information alert stage (e.g., block 7), or the stress alerts stage (e.g., block 8).

At block 6, the method comprises filling in missing information. According to some embodiments, filling in the missing information may comprise populating at least one field and/or data point comprised in the emergency data that is missing and/or incomplete. In some embodiments, the live audio stream and/or a second live audio stream may comprise and/or help populate the missing information. In other embodiments, this may be referred to as the slot filling stage.

At block 7, the method comprises detecting at least one incomplete field. According to yet other embodiments, detecting the at least one incomplete field may comprise determining at least one field and/or data point comprised in the emergency data that is missing and/or incomplete. In still other embodiments, upon detecting the at least one incomplete field, the method may comprise generating a response to the live audio stream to populate and/or fill the at least one incomplete field. According to other embodiments, this may be referred to as the missing information alert stage.

At block 8, the method comprises triggering a stress alert. In some cases, the stress alert is triggered when a stress indicator (e.g., a stress indicator associated with the emergency, a stress indicator associated with the caller, etc.) reaches and/or is determined to be a value greater than a threshold value. In other cases, this may be referred to as the stress alerts stage.

At block 9, the method comprises classifying an intent associated with the emergency. According to one embodiment, the intent associated with the emergency comprises at least one of: a harmful intent, self-harm, harm to others, a threat, a hazard, etc. In another embodiment, this may be referred to as the harmful intent classification stage.

At block 10, the method comprises generating a severity score and a routing decision. According to yet another embodiment, the severity score and/or the routing decision is based on the stress indicator, a hazard, the emergency data, the missing information, the intent associated with the emergency, any other previously determined and/or generated data, etc. In still another embodiment, the severity score may comprise a severity indicator associated with the emergency. According to a further embodiment, the routing decision may comprise a computing system and/or a group (e.g., responders) to receive data associated with the emergency (e.g., to handle the emergency). In other cases, this may be referred to as the severity scoring and routing decision stage.

At block 11, the method comprises refining the routing data. In some cases, refining the routing data comprises retrieving and/or applying at least one protocol associated with the emergency and/or general emergencies. In other cases, refining the routing data comprises using retrieval-augmented generation. In still other cases, this may be referred to as the dynamic RAG retrieval stage.

At block 12, the method comprises constructing a timeline associated with the emergency. In some embodiments, constructing the timeline associated with the emergency comprises ordering events (e.g., fragmented events) associated with the emergency and/or the live audio stream. According to other embodiments, this may be referred to as the timeline construction stage.

At block 13, the method comprises generating at least one document associated with the emergency and/or the live audio stream. In yet other embodiments, the at least one document comprises or is comprised in a structured incident report. According to still other embodiments, the at least one document may comprise the emergency data, the severity indicator, the routing decision, the intent classification, etc. In further embodiments, this may be referred to as the documentation generation stage.

At block 14, the method comprises dispatching and/or routing data to a computing system or group. In some cases, dispatching and/or routing the data to the computing system or group may comprise generating alerts and/or a summary associated with at least one audio stream comprising the live audio stream (e.g., a conversation with the caller). In other cases, dispatching and/or routing the data to the computing system or group may comprise transmitting the structured incident report and/or the emergency data and/or the severity indicator, etc. to the computing system or group (e.g., to be taken over by the computing system or group, to be handled by the computing system or group, etc.). In yet other cases, this may be referred to as the dispatch stage.

Exemplary Workflow

Figure 6A:
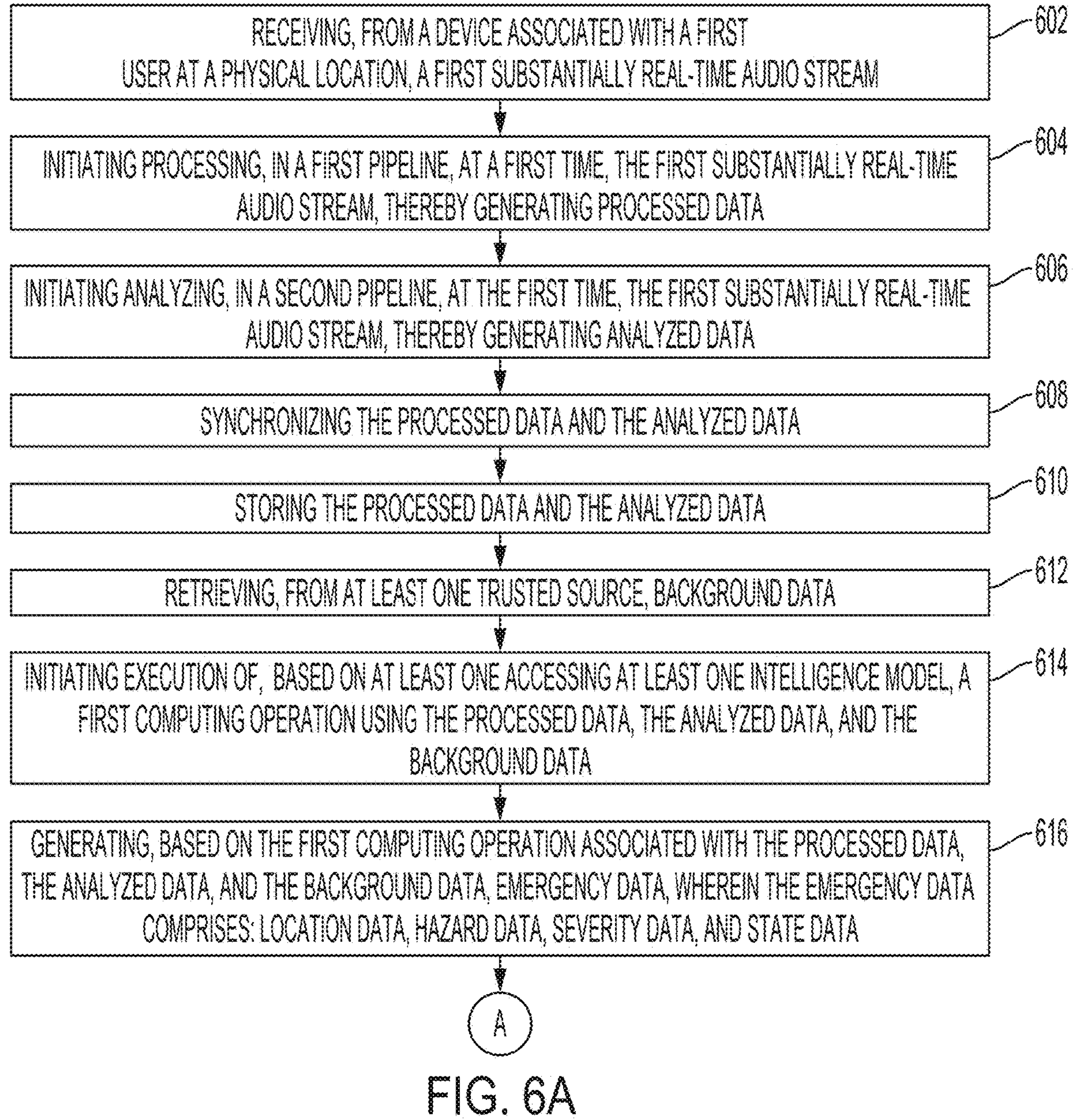
FIGS. 6A-6B show exemplary flowcharts for agentic methods, systems/apparatuses, and computer program products that intelligently handle an emergency call.
Figure 6B:
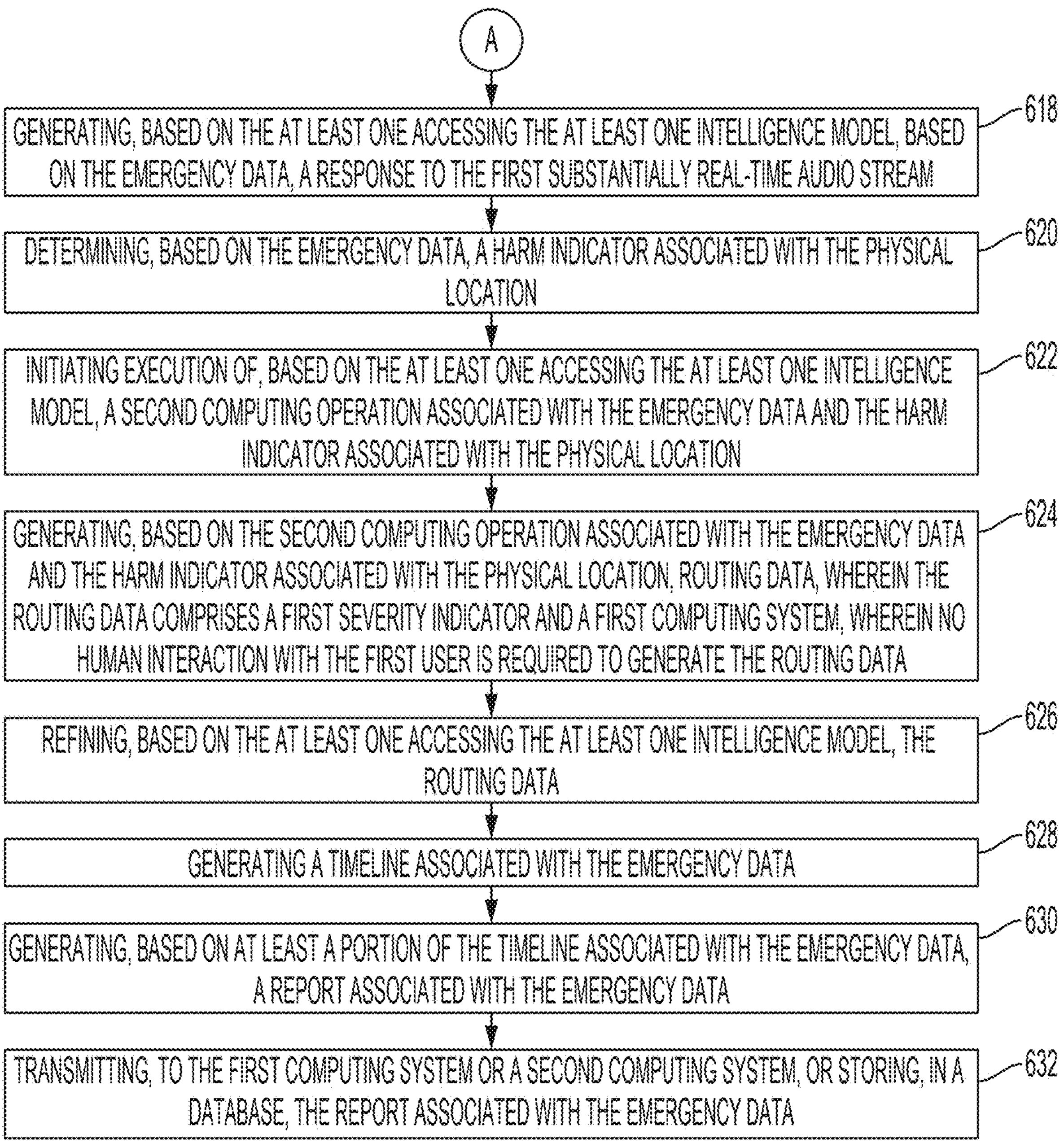

FIGS. 6A and 6B illustrate an exemplary workflow for utilizing an intelligent context-aware alert system for proactive roadway intersection safety. The various blocks of FIGS. 6A and 6B may be executed in a different order from that shown in FIGS. 6A and 6B. Some blocks may be optional. It is appreciated that one or more data engines stored in one or more memory devices may cause one or more computing device processors to execute the various processing stages of the workflow of FIGS. 6A and 6B.

In one embodiment, one or more data units, comprising control logic or applications stored in a non-transitory memory device, can enable the implementation of various processing stages within the workflow of FIGS. 6A and 6B. These data units can operate independently or in conjunction with a data communication software tool for transmitting and/or receiving data, such as real-time, substantially real-time, or near real-time data. Furthermore, the one or more data units may comprise or be in communication with one or more of the above-referenced data unit 136 and/or intelligence unit 140, which collectively facilitate data handling and intelligent analysis. In one embodiment, sensor data may comprise static or dynamic visual and/or audio data that is processed or otherwise analyzed to handle an emergency call and/or route help to an emergency and/or collect information associated with an emergency, thereby supporting applications for proactive emergency call handling.

At block 602 of FIG. 6A, the method comprises receiving, from a device associated with a first user at a physical location, a first substantially real-time audio stream. In some embodiments, the first substantially real-time audio stream comprises a phone call, an audio clip, etc. According to other embodiments, an emergency (e.g., a medical emergency, a car accident, etc.) is occurring and/or has recently (e.g., in the last few minutes, in the last hour, etc.) occurred at the physical location. In yet other embodiments, the first user comprises a witness to the emergency and/or a victim of the emergency and/or a person who discovers the emergency, etc.

At block 604, the method comprises initiating processing, in a first pipeline, at a first time, the first substantially real-time audio stream, thereby generating processed data. According to one embodiment, processing the first substantially real-time audio stream comprises at least one of: extracting data (e.g., an entity, a feature, a semantic feature, etc.) comprised in the first substantially real-time audio stream, classifying data (e.g., an intent, a severity, etc.) comprised in the first substantially real-time audio stream, using automatic speech recognition (ASR) (e.g., to convert the first substantially real-time audio stream to text). In another embodiment, processing the first substantially real-time audio stream comprises a speech processing and analysis (e.g., generating a transcript of the first substantially real-time audio stream, analyzing the transcript, extracting data from the transcript, etc.). It is appreciated that substantially real-time streaming may comprise a short delay (e.g., a few milliseconds, a few seconds, etc.).

At block 606, the method comprises initiating analyzing, in a second pipeline, at the first time, the first substantially real-time audio stream, thereby generating analyzed data. In some cases, analyzing the first substantially real-time audio stream comprises determining and/or identifying at least one of: a noise signature, a noise pattern, a stress indicator, a hazard, an environmental hazard indicator, a non-linguistic event classification, an irregularity, a panic indicator, etc. associated with the live audio stream. In other cases, analyzing the first substantially real-time audio stream comprises a raw audio analysis (e.g., analyzing background noise and/or tone of voice and/or volume of voice, etc.) In yet other cases, the first pipeline and the second pipeline are occurring and/or running in parallel (e.g., at the same time). It is further appreciated that a pipeline may refer to a distinct execution stage and/or a set of data processing elements.

At block 608, the method comprises synchronizing the processed data and the analyzed data. In some embodiments, synchronizing the processed data and the analyzed data comprises fusing and/or combining the processed data and the analyzed data (e.g., into a unified representation). According to other embodiments, synchronizing the processed data and the analyzed data comprises using weighted alignment rules. It is appreciated that, synchronizing the processed data and the analyzed data may improve accuracy in data collection and/or routing decisions (e.g., when callers are distressed, when callers are interrupted, when callers are in loud environments, etc.).

At block 610, the method comprises storing the processed data and the analyzed data. In yet other embodiments, the processed data and the analyzed data may be stored in a local database and/or an external database. At block 612, the method comprises retrieving, from at least one trusted source, background data. In some cases, retrieving the background data comprises using retrieval-augmented generation (RAG). In other cases, the at least one trusted source comprises at least one of: an official emergency source, a trusted knowledge source, an emergency protocol source, or a dynamically prioritized retrieval source. In still other cases, the at least one trusted source comprises at least one source that provides relevant and/or verified and/or truthful and/or official data.

At block 614, the method comprises initiating execution of, based on at least one accessing at least one intelligence model, a first computing operation using the processed data, the analyzed data, and the background data. In some embodiments, the at least one accessing the at least one intelligence model may occur at multiple different times (e.g., throughout the call, throughout the method, etc.). According to other embodiments, the at least one intelligence model may be hosted locally (e.g., on an internal server). In yet other embodiments, the at least one intelligence model may be hosted externally (e.g., on an external server). According to still other embodiments, the first computing operation may analyze the processed data and/or the analyzed data and/or the background data to generate data associated with the emergency and/or to plan for handling responding to the first substantially real-time audio stream and/or to plan for handling the emergency.

At block 616, the method comprises generating, based on the first computing operation associated with the processed data, the analyzed data, and the background data, emergency data, wherein the emergency data comprises: location data, hazard data, severity data, and state data. In one embodiment, the emergency data is comprised in an output of the at least one intelligence model. According to another embodiment, the location data comprises or is associated with at least one of: the physical location, global positioning system (GPS) data, or an address. It is appreciated that the location data may be extracted from the first substantially real-time audio stream and/or from a second substantially real-time audio stream and/or from geolocating or tracking the first substantially real-time audio stream, etc. In yet another embodiment, the hazard data comprises or is associated with at least one of: a hazard type (e.g., a medical emergency, a self-harm situation, a fire, an accident, a terror event, an environmental hazard, etc.), an emergency situation, or a hazardous condition.

According to still another embodiment, the severity data comprises or is based on at least one of: a stress level associated with the first user, an intensity level associated with the first user and/or the physical location, a noise level associated with the first user and/or the physical location (e.g., volume of speech, volume of background noises, etc.), a speech velocity associated with the first user, or at least one keyword comprised in the first substantially real-time audio stream. In a further embodiment, the state data comprises or is based on at least one of: a first state associated with the first user, a second state associated with a victim, a third state associated with the physical location, a fourth state associated with a perpetrator, or a number of people at the physical location. It is also appreciated that missing information from the emergency data may be highlighted and/or emphasized (e.g., so a response to the first user may prompt for the missing information, for dispatchers to be aware of the missing information, etc.).

Turning to FIG. 6B, at block 618, the method comprises generating, based on the at least one accessing the at least one intelligence model, based on the emergency data, a response to the first substantially real-time audio stream. In some embodiments, the response to the first substantially real-time audio stream comprises a request for the missing information from the emergency data. According to other embodiments, the response is adapted based on the emergency data (e.g., based on the first state associated with the first user, based on the severity data, based on the hazard data, etc.) to respond appropriately (e.g., efficiently learn information while being understanding and/or compassionate with the first user) given context.

At block 620, the method comprises determining, using the one or more computing device processors, based on the emergency data, a harm indicator associated with the physical location. In some cases, determining the harm indicator associated with the physical location comprises classifying type of harm occurring at the physical location. In other cases, the harm indicator comprises a binary value (e.g., true or false), a categorical value (e.g., harm type 1, harm type 2, etc.), or a scale value (e.g., number on a scale of 1 to 10).

At block 622, the method comprises initiating execution of, using the one or more computing device processors, based on the at least one accessing the at least one intelligence model, a second computing operation associated with the emergency data and the harm indicator associated with the physical location. According to one embodiment, the second computing operation associated with the emergency data and the harm indicator associated with the physical location comprises and/or is associated with determining how to handle and/or who should handle the emergency based on the emergency data and the harm indicator associated with the physical location.

At block 624, the method comprises generating, based on the second computing operation associated with the emergency data and the harm indicator associated with the physical location, routing data, wherein the routing data comprises a first severity indicator and a first computing system, wherein no human interaction with the first user is required to generate the routing data. In another embodiment, the first severity indicator comprises a binary value (e.g., severe or not severe), a categorical value (e.g., severity type 1, severity type 2, etc.), or a scale value (e.g., number on a scale of 1 to 10). According to yet another embodiment, the first computing system comprises a system associated with dispatchers and/or emergency workers that can handle the emergency.

At block 626, the method comprises refining, using the one or more computing device processors, based on the at least one accessing the at least one intelligence model, the routing data. In some cases, refining the routing data comprises retrieving and/or applying at least one protocol (e.g., a rule, a procedure, a law, etc.) associated with the emergency and/or general emergencies. Furthermore, in other cases, refining the routing data comprising using retrieval-augmented generation to update the routing data. In yet other cases, refining the routing data may be optional and/or minimally applied.

At block 628, the method comprises generating, using the one or more computing device processors, a timeline associated with the emergency data. According to some embodiments, the timeline associated with the emergency data comprises ordering events and/or data associated with the emergency. In other embodiments, generating (e.g., constructing) the timeline associated with the emergency data is based on extracted and/or determined and/or analyzed data from the first substantially real-time audio stream and/or additional audio stream(s).

At block 630, the method comprises generating, using the one or more computing device processors, based on at least a portion of the timeline associated with the emergency data, a report associated with the emergency data. According to yet other embodiments, the report associated with the emergency data comprises at least one document, an incident report, a structured report, etc. In still other embodiments, the report associated with the emergency data comprises at least one of: the portion of the timeline associated with the emergency data, the timeline associated with the emergency data, the emergency data, the missing information from the emergency data, the first severity indicator, the first computing system, the harm indicator associated with the physical location, a transcript and/or a portion of a transcript (e.g., from the first substantially real-time audio stream, from additional audio streams, etc.), etc.

At block 632, the method comprises transmitting, using the one or more computing device processors, to the first computing system or a second computing system, or storing, using the one or more computing device processors, in a database, the report associated with the emergency data. In some cases, the second computing system comprises a supervising system and/or a routing system (e.g., a system that will route the report to dispatchers for handling the emergency). In other cases, the report associated with the emergency data is transmitted to the first computing system or the second computing system and stored in the database.

According to some embodiments, the method further comprises transmitting, to the device associated with the first user, the response to the first substantially real-time audio stream; and receiving, from the device associated with the first user, a second substantially real-time audio stream. In some cases, the second substantially real-time audio stream comprises at least some of the missing information from the emergency data. In other embodiments, the method further comprises: detecting, using the one or more computing device processors, an incomplete field comprised in the emergency data; generating, using the one or more computing device processors, based on the incomplete field comprised in the emergency data, a prompt for the first user; transmitting, using the one or more computing device processors, to the device associated with the first user, the prompt; and receiving, using the one or more computing device processors, from the device associated with the first user, a second substantially real-time audio stream.

Furthermore, in some cases, the method further comprises: initiating processing, using the one or more computing device processors, the second substantially real-time audio stream, thereby generating second processed data; initiating execution of, using the one or more computing device processors, based on at least one accessing the at least one intelligence model, a third computing operation using the second processed data, the analyzed data, and the background data; updating, using the one or more computing device processors, based on the second computing operation associated with the second processed data, the analyzed data, and the background data, the emergency data, thereby generating updated emergency data; updating, using the one or more computing device processors, based on the updated emergency data, the harm indicator associated with the physical location, thereby generating an updated harm indicator; initiating execution of, using the one or more computing device processors, a fourth computing operation associated with the updated emergency data and the updated harm indicator; and updating, using the one or more computing device processors, based on the fourth computing operation associated with the updated emergency data and the updated harm indicator, the routing data, thereby generating updated routing data comprising a second severity indicator.

It is appreciated that, in other cases, the emergency data may be continuously (e.g., at least partially continuously, every few seconds, every minute, etc.) updated (e.g., prior to generating the report) based on receiving additional audio streams from the first user and/or a second user. According to yet other embodiments, the method further comprises: determining, using the one or more computing device processors, if a first field comprised in the emergency data is greater than a threshold value; and triggering, using the one or more computing device processors, based on determining the first field comprised in the emergency data is greater than the threshold value, a notification.

It is appreciated that no human interaction with the first user is required for any of the steps described in this method (e.g., an AI agent can perform any and/or all of the steps described in this method). It is also appreciated that the methods and systems described herein may be used for handling any type of call (i.e., not just an emergency call).

The terminology used in this disclosure is for the purpose of describing particular exemplary embodiments and is not intended to be limiting. For example, as used herein, the singular forms "a", "an" and "the" may be intended to include plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, processes, elements, components, and/or groups thereof. The described method steps, processes, and operations are not to be construed as necessarily requiring their performance in the particular order discussed or illustrated, unless specifically identified as an order of performance. It is further appreciated that additional or alternative steps may be employed according to some implementations.

Although the terms first, second, third, etc., may be used to describe various elements, components, regions, layers and/or sections, these elements, components, regions, layers and/or sections should not be limited by these terms. These terms may be used to distinguish one element, component, region, layer or section from another element, component, region, layer or section. That is, terms such as "first," "second," and other numerical terms, when used in this disclosure, do not imply a sequence or order unless clearly indicated by the context. In addition, the term optimal and its variants (e.g., efficient, optimally, etc.) as used in this disclosure may simply indicate improving, rather than the ultimate form of 'perfection' or the like.

Reference in the specification to "one implementation" or "an implementation" means that a particular feature, structure, or characteristic described in connection with the implementation is included in at least one implementation of the disclosure. The appearances of the phrase "in one implementation," "in some implementations," "in one instance," "in some instances," "in one case," "in some cases," "in one embodiment," or "in some embodiments" in various places in the specification are not necessarily all referring to the same implementation or embodiment.

Finally, the above descriptions of the implementations of the present disclosure have been presented for the purposes of illustration and description. It is not intended to be exhaustive or to limit the present disclosure to the precise form disclosed. Many modifications and variations are possible in light of the above teaching. It is appreciated that the scope of the present disclosure be limited not by this detailed description, but rather by the claims of this application. The present disclosure may be embodied in other specific forms without departing from the spirit or essential characteristics thereof. Accordingly, the above discussed subject-matter is illustrative, but not limiting, of the scope of the present disclosure, which is set forth in the following claim.

What is claimed is:

1. A method for intelligently handling an emergency call, the method comprising:

receiving, using one or more computing device processors, from a device associated with a first user at a physical location, a first substantially real-time audio stream;

initiating processing, using the one or more computing device processors, in a first pipeline, at a first time, the first substantially real-time audio stream, thereby generating processed data;

initiating analyzing, using the one or more computing device processors, in a second pipeline, at the first time, the first substantially real-time audio stream, thereby generating analyzed data;

synchronizing, using the one or more computing device processors, the processed data and the analyzed data;

storing, using the one or more computing device processors, the processed data and the analyzed data;

retrieving, using the one or more computing device processors, from at least one trusted source, background data;

initiating execution of, using the one or more computing device processors, based on at least one accessing at least one intelligence model, a first computing operation using the processed data, the analyzed data, and the background data;

generating, using the one or more computing device processors, based on the first computing operation associated with the processed data, the analyzed data, and the background data, emergency data, wherein the emergency data comprises:

location data, hazard data, severity data, and state data;

generating, using the one or more computing device processors, based on the at least one accessing the at least one intelligence model, based on the emergency data, a response to the first substantially real-time audio stream;

determining, using the one or more computing device processors, based on the emergency data, a harm indicator associated with the physical location;

initiating execution of, using the one or more computing device processors, based on the at least one accessing the at least one intelligence model, a second computing operation associated with the emergency data and the harm indicator associated with the physical location;

generating, using the one or more computing device processors, based on the second computing operation associated with the emergency data and the harm indicator associated with the physical location, routing data, wherein the routing data comprises a first severity indicator and a first computing system, wherein no human interaction with the first user is required to generate the routing data;

refining, using the one or more computing device processors, based on the at least one accessing the at least one intelligence model, the routing data;

generating, using the one or more computing device processors, a timeline associated with the emergency data;

generating, using the one or more computing device processors, based on at least a portion of the timeline associated with the emergency data, a report associated with the emergency data; and transmitting, using the one or more computing device processors, to the first computing system or a second computing system, or storing, using the one or more computing device processors, in a database, the report associated with the emergency data.

2. The method of claim 1, further comprising:

transmitting, using the one or more computing device processors, to the device associated with the first user, the response to the first substantially real-time audio stream; and receiving, using the one or more computing device processors, from the device associated with the first user, a second substantially real-time audio stream.

3. The method of claim 1, further comprising:

detecting, using the one or more computing device processors, an incomplete field comprised in the emergency data;

generating, using the one or more computing device processors, based on the incomplete field comprised in the emergency data, a prompt for the first user;

transmitting, using the one or more computing device processors, to the device associated with the first user, the prompt; and receiving, using the one or more computing device processors, from the device associated with the first user, a second substantially real-time audio stream.

4. The method of claim 1, further comprising:

determining, using the one or more computing device processors, if a first field comprised in the emergency data is greater than a threshold value; and triggering, using the one or more computing device processors, based on determining the first field comprised in the emergency data is greater than the threshold value, a notification.

5. The method of claim 1, wherein the determining the harm indicator associated with the physical location comprises classifying type of harm occurring at the physical location.

6. The method of claim 1, wherein the first substantially real-time audio stream comprises at least one of: a recording or a transcript.

7. The method of claim 1, wherein the one or more computing device processors are comprised in one or more computing systems, wherein the one or more computing systems are located in one or more locations.

8. One or more systems for intelligently handling an emergency call, the one or more systems comprising one or more computing servers comprising:

one or more computing device processors; and a memory storing instructions, the instructions being executable by the one or more computing device processors to:

receive, from a device associated with a first user at a physical location, a first substantially real-time audio stream;

initiate processing, in a first pipeline, at a first time, the first substantially real-time audio stream, thereby generating processed data;

initiate analyzing, in a second pipeline, at the first time, the first substantially real-time audio stream, thereby generating analyzed data;

synchronize the processed data and the analyzed data;

store the processed data and the analyzed data;

retrieve, from at least one trusted source, background data;

initiate execution of, based on at least one accessing at least one intelligence model, a first computing operation using the processed data, the analyzed data, and the background data;

generate, based on the first computing operation using the processed data, the analyzed data, and the background data, emergency data, wherein the emergency data comprises:

location data, hazard data, severity data, and state data;

generate, based on the at least one accessing the at least one intelligence model, based on the emergency data, a response to the first substantially real-time audio stream;

determine, based on the emergency data, a harm indicator associated with the physical location;

initiate execution of, based on the at least one accessing the at least one intelligence model, a second computing operation associated with the emergency data and the harm indicator associated with the physical location;

generate, based on the second computing operation associated with the emergency data and the harm indicator associated with the physical location, routing data, wherein the routing data comprises a first severity indicator and a first computing system, wherein no human interaction is requited to generate the routing data;

refine, based on accessing the at least one intelligence model, the routing data;

generate a timeline associated with the emergency data;

generate, based on at least a portion of the timeline associated with the emergency data, a report associated with the emergency data; and transmit, to the first computing system or a second computing system, the report associated with the emergency data.

9. The one or more systems of claim 8, wherein the location data comprises or is associated with at least one of: the physical location, global positioning system (GPS) data, or an address.

10. The one or more systems of claim 8, wherein the hazard data comprises or is associated with at least one of: a hazard type, a medical emergency, a self-harm situation, a fire, an accident, an emergency situation, a terror event, an environmental hazard, or a hazardous condition.

11. The one or more systems of claim 8, wherein the severity data comprises or is based on at least one of: a stress level associated with the first user, an intensity level, a noise level, a speech velocity associated with the first user, or at least one keyword comprised in the first substantially real-time audio stream.

12. The one or more systems of claim 8, wherein the state data comprises or is based on at least one of: a first state associated with the first user, a second state associated with a victim, a third state associated with the physical location, or a number of people at the physical location.

13. The one or more systems of claim 8, wherein the at least one trusted source comprises a dynamically prioritized retrieval source.

14. A method for intelligently handling an emergency call, the method comprising:

receiving, using one or more computing device processors, from a device associated with a first user at a physical location, a first substantially real-time audio stream;

initiating processing, using the one or more computing device processors, in a first pipeline, at a first time, the first substantially real-time audio stream, thereby generating processed data;

initiating analyzing, using the one or more computing device processors, in a second pipeline, at the first time, the first substantially real-time audio stream, thereby generating analyzed data;

synchronizing, using the one or more computing device processors, the processed data and the analyzed data;

storing, using the one or more computing device processors, the processed data and the analyzed data;

retrieving, using the one or more computing device processors, from at least one trusted source, background data;

initiating execution of, using the one or more computing device processors, based on at least one accessing at least one intelligence model, a first computing operation using the processed data, the analyzed data, and the background data;

generating, using the one or more computing device processors, based on the first computing operation using the processed data, the analyzed data, and the background data, emergency data, wherein the emergency data comprises at least two of:

location data, hazard data, severity data, or state data;

generating, using the one or more computing device processors, based on the at least one accessing the at least one intelligence model, based on the emergency data, a response to the first substantially real-time audio stream;

determining, using the one or more computing device processors, based on the emergency data, a harm indicator associated with the physical location;

initiating execution of, using the one or more computing device processors, based on the at least one accessing the at least one intelligence model, a second computing operation associated with the emergency data and the harm indicator associated with the physical location;

generating, using the one or more computing device processors, based on the second computing operation associated with the emergency data and the harm indicator associated with the physical location, routing data, wherein the routing data comprises a first severity indicator and a first computing system, wherein no human interaction is requited to generate the routing data;

refining, using the one or more computing device processors, based on the at least one accessing the at least one intelligence model, the routing data;

generating, using the one or more computing device processors, a timeline associated with the emergency data;

generating, using the one or more computing device processors, based on at least a portion of the timeline associated with the emergency data, a report associated with the emergency data; and transmitting, using the one or more computing device processors, to the first computing system or a second computing system, the report associated with the emergency data.

15. The method of claim 14, further comprising:

transmitting, using the one or more computing device processors, to the device associated with the first user, the response to the first substantially real-time audio stream; and receiving, using the one or more computing device processors, from the device associated with the first user, a second substantially real-time audio stream.

16. The method of claim 14, further comprising:

detecting, using the one or more computing device processors, an incomplete field comprised in the emergency data;

generating, using the one or more computing device processors, based on the incomplete field comprised in the emergency data, a prompt for the first user;

transmitting, using the one or more computing device processors, to the device associated with the first user, the prompt; and receiving, using the one or more computing device processors, from the device associated with the first user, a second substantially real-time audio stream.

17. The method of claim 16, further comprising:

initiating processing, using the one or more computing device processors, the second substantially real-time audio stream, thereby generating second processed data;

initiating execution of, using the one or more computing device processors, based on at least one accessing the at least one intelligence model, a third computing operation using the second processed data, the analyzed data, and the background data;

updating, using the one or more computing device processors, based on the second computing operation associated with the second processed data, the analyzed data, and the background data, the emergency data, thereby generating updated emergency data;

updating, using the one or more computing device processors, based on the updated emergency data, the harm indicator associated with the physical location, thereby generating an updated harm indicator;

initiating execution of, using the one or more computing device processors, a fourth computing operation associated with the updated emergency data and the updated harm indicator; and updating, using the one or more computing device processors, based on the fourth computing operation associated with the updated emergency data and the updated harm indicator, the routing data, thereby generating updated routing data comprising a second severity indicator.

18. The method of claim 14, further comprising:

determining, using the one or more computing device processors, if a first field comprised in the emergency data is greater than a threshold value; and triggering, using the one or more computing device processors, based on determining the first field comprised in the emergency data is greater than the threshold value, a notification.

19. The method of claim 14, wherein the processed data comprises at least one of: a transcript associated with the first substantially real-time audio stream, a semantic feature extracted from the first substantially real-time audio stream, an entity extracted from the first substantially real-time audio stream, or a harmful intent classification determined based on the transcript associated with the first substantially real-time audio stream and acoustic cues comprised in the first substantially real-time audio stream.

20. The method of claim 18, wherein the analyzed data comprises at least one of: a noise signature associated with the first substantially real-time audio stream, a noise pattern associated with the first substantially real-time audio stream, an environmental hazard indicator associated with the first substantially real-time audio stream, a non-linguistic event classification associated with the first substantially real-time audio stream, an irregularity associated with the first substantially real-time audio stream, a stress indicator associated with the first substantially real-time audio stream, or a panic indicator associated with the first substantially real-time audio stream.

* * * * *